US009450348B2

(12) United States Patent
O'Rourke

(10) Patent No.: US 9,450,348 B2
(45) **Date of Patent: *Sep. 20, 2016**

(54) ELECTRICAL ADAPTOR HAVING A TEMPERATURE INDICATOR

(71) Applicant: Kevin O'Rourke, Cleveland, MN (US)

(72) Inventor: Kevin O'Rourke, Cleveland, MN (US)

(73) Assignee: Kevin O'Rourke, Cleveland, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,264

(22) Filed: Sep. 12, 2014

(65) Prior Publication Data

US 2015/0004831 A1 Jan. 1, 2015

Related U.S. Application Data

(63) Continuation of application No. 14/050,881, filed on Oct. 10, 2013, now Pat. No. 8,834,198, which is a continuation of application No. 11/891,681, filed on Aug. 10, 2007.

(60) Provisional application No. 60/836,801, filed on Aug. 10, 2006.

(51) Int. Cl.

| | |
|---|---|
| ***H02H 5/04*** | (2006.01) |
| ***H01R 3/00*** | (2006.01) |
| ***H01R 13/66*** | (2006.01) |
| ***H01R 31/02*** | (2006.01) |

(52) U.S. Cl.

CPC ...... *H01R 13/6691* (2013.01); *H01R 13/6683* (2013.01); *H01R 31/02* (2013.01)

(58) Field of Classification Search

CPC .................... H01R 13/6691; H01R 13/66813; H01R 31/02; H01R 13/72

USPC .......... 439/501, 490, 488, 917, 161, 620.08; 361/103–106; 324/104, 508, 750.03, 324/750.06, 670, 638.18, 870.17; 340/581, 340/584, 643

See application file for complete search history.

(56) References Cited

U.S. PATENT DOCUMENTS

| | | | |
|---|---|---|---|
| 1,512,888 | A | 10/1924 | Haft |
| 1,758,982 | A | 5/1930 | Seghers |
| 1,818,884 | A | 8/1931 | Eckstein |
| 1,974,472 | A | 9/1934 | Seghers |
| 2,456,038 | A | 12/1948 | Young |
| 2,675,444 | A | 4/1954 | Hyman |
| 2,680,234 | A | 6/1954 | Kissick |
| 3,359,527 | A | 12/1967 | Hart |

(Continued)

*Primary Examiner* — Abdullah Riyami
*Assistant Examiner* — Harshad Patel
(74) *Attorney, Agent, or Firm* — Merchant & Gould P.C.

(57) ABSTRACT

An electrical adaptor comprising a housing. A male electrical plug comprises a prong extending from the housing and is configured as a standard 120-volt male plug. The prong comprises a distal tip, and the distal tip forms an end to the male electrical plug. A female socket is electrically connected to the male electrical plug and comprises an electrical contact positioned in the housing. The female socket is configured to receive a standard 120-volt male plug. The electrical contact comprises a distal tip, and the distal tip forms an end to the female socket. At least one thermal indicator circuit is electrically connected to the male electrical plug and the female socket and is electrically positioned between an end of the male plug and an end of the female socket. The thermal indicator circuit is configured to actuate an alarm upon detecting a temperature at or above a threshold temperature without interrupting electrical flow between the male electrical plug and the female socket.

17 Claims, 24 Drawing Sheets

(56) References Cited

U.S. PATENT DOCUMENTS 3,409,858 A 11/1968 Krehbiel
3,536,907 A 10/1970 Kramer
3,584,213 A 6/1971 Meltzer
3,594,681 A 7/1971 Weiss
3,656,083 A 4/1972 Brook
3,890,030 A 6/1975 McDaniel
4,037,901 A 7/1977 Kaszuba
4,083,621 A 4/1978 Davidson et al.
4,278,970 A 7/1981 Streczyn et al.
4,369,487 A 1/1983 Carlow
4,390,228 A 6/1983 Sclleusner
4,520,239 A 5/1985 Schwartz
4,577,094 A 3/1986 Mills
4,644,456 A 2/1987 Lydell
4,653,829 A 3/1987 LaMont
4,717,350 A 1/1988 Lax
4,781,609 A 11/1988 Wilson et al.
4,861,288 A 8/1989 Friedman
4,864,477 A 9/1989 Engelman
4,875,874 A 10/1989 Windsor, Jr.
5,071,367 A 12/1991 Luu
5,096,434 A 3/1992 Byrne
5,102,345 A 4/1992 Stanwick et al.
5,171,159 A 12/1992 Byrne
5,174,785 A 12/1992 Endo et al.
5,213,519 A 5/1993 Dorfman
5,234,360 A 8/1993 Kramer, Jr.
5,236,374 A 8/1993 Leonard et al.
5,238,416 A 8/1993 Dickie
5,238,424 A 8/1993 Vindum
5,308,253 A 5/1994 Maki
5,315,476 A 5/1994 Hedrick
5,453,916 A 9/1995 Tennis et al.
5,541,803 A * 7/1996 Pope, Jr. ................ H01B 7/324 361/103
5,542,852 A 8/1996 Hsueh
5,600,306 A * 2/1997 Ichikawa ........... H01R 13/7137 361/103
5,642,248 A 6/1997 Campolo et al.
5,657,841 A 8/1997 Morvan
5,742,464 A * 4/1998 Ceola ................. H01R 13/7137 361/103
5,742,466 A 4/1998 Kram
5,833,357 A 11/1998 Ting
5,834,696 A 11/1998 Kurosawa et al.
5,841,617 A 11/1998 Watkins, Jr. et al.
5,862,030 A 1/1999 Watkins, Jr. et al.
5,899,761 A 5/1999 Crane et al.
5,900,804 A 5/1999 Yewell
5,902,148 A 5/1999 O'Rourke
5,917,416 A 6/1999 Read
5,931,702 A 8/1999 Fladung
5,993,239 A 11/1999 Wright
6,315,617 B1 11/2001 Al-Sabah
6,409,531 B1 6/2002 Millard
6,481,875 B1 11/2002 Bryant
6,486,407 B1 11/2002 Hawker et al.
6,512,444 B1 1/2003 Morries et al.
6,514,099 B2 2/2003 Endo
6,552,888 B2 4/2003 Weinberger
6,603,385 B2 8/2003 Kitchens
6,801,117 B2 10/2004 Morris et al.
6,805,579 B2 10/2004 Marchand et al.
6,863,555 B2 3/2005 Ito
6,893,153 B2 5/2005 Hoffer et al.
6,929,514 B1 8/2005 Chuang
6,985,083 B2 1/2006 Yost et al.
7,066,616 B2 6/2006 Howell
7,198,502 B2 4/2007 Koenig et al.
7,210,813 B2 5/2007 Harwood
7,410,377 B2 8/2008 Wharton
7,515,057 B2 4/2009 Chen
D599,290 S 9/2009 Lee
D614,134 S 4/2010 Chen et al.
D618,617 S 6/2010 Lee
7,808,761 B2 * 10/2010 O'Rourke .............. H02H 7/228 361/103
8,242,918 B2 8/2012 Brusveen et al.
8,541,716 B2 9/2013 Gu et al.
8,834,198 B2 * 9/2014 O'Rourke .......... H01R 13/7137 361/103
2004/0023548 A1 2/2004 Noro
2004/0092158 A1 5/2004 Chien
2004/0259412 A1 12/2004 Howell
2005/0014412 A1 1/2005 Wharton
2005/0221674 A1 * 10/2005 Ching ................ H01R 13/6608 439/620.21
2006/0232366 A1 10/2006 Li

* cited by examiner

ELECTRICAL ADAPTOR HAVING A TEMPERATURE INDICATOR

REFERENCE TO CO-PENDING PATENT APPLICATIONS

This patent application is a continuation of U.S. application Ser. No. 14/050,881, filed Oct. 10, 2013, which is a continuation of U.S. application Ser. No. 11/891,681, filed Aug. 10, 2007, which claims the benefit of U.S. provisional application Ser. No. 60/836,801, filed Aug. 10, 2006, and the entire disclosures of these applications are incorporated herein by reference in their entirety.

BACKGROUND

Electrical cords, and in particular extension cords, are used extensively in many applications, in both residential and commercial applications, because they provide a way to deliver electrical power from an electrical outlet to equipment that is far away from the outlet. However, there are significant issues surrounding safety and convenience that are associated with the use of extension cords.

One safety issue often associated with construction sites is the use of many extension cords because of the large number of tools that need electricity to operate. Typically these devices may not be plugged into the same cord because they would, in combination, require too much current to be safely provided through a single cord. This safety concern is especially true at construction sites where at least some of the equipment draws a large amount of power.

Furthermore, additional extension cords may be necessary because different pieces of equipment require different amounts of voltage to operate. For example, most electrically operated devices require a 120V source. However, some devices use a large amount of power and thus require 208V or 240V supplies.

Extensive usage of extension cords increases the probability of an electrical fault, cord degradation, or cord overloading. Cord degradation and failure when using a high-amperage power source and cord can cause fires, electrical shocks, and other hazards. Existing safety fuses and ground fault interrupter (GFI) circuits within electrical cords can sense sudden catastrophic electrical events, such as power failures, power surges, or other electrical or physical events caused on the source side of the electrical cord. These safety devices are integrated into the electrical cord and allow an electrical cord to disconnect upon occurrence of an electrical event.

Fuses and GFI circuits may not protect against various types of gradual failures, such as due to physical wear or thermal degradation. Sudden short circuits at the load end of the cord remain unprotected by these devices as well. Additionally, fuses and GFI circuits are typically connected in series with the cord so that if the fuse or GFI circuit is tripped, the entire cord is disabled. When a cord has multiple receptacles providing power to different tools and devices, a failure in one of the devices would trip the fuse or GFI and disconnect power to all of the receptacles and all of the devices that are plugged into the cord. Such an event can be startling and potentially hazardous to other users.

Heating is another safety problem for both commercial and residential extension cords even when the cord is overloaded. Extension cords that have a flaw such as a loose connector, partially broken wire, or kink have a point of increased resistance that causes resistive heating even when the current drawn through the cord is within its rated capacity. Such conditions can cause the extension cord to overheat and potentially ignite starting a fire, especially if the extension cord is adjacent a flammable material such as wood, clothing, or chemicals.

Yet another problem relates to extension cords that include locking mechanisms holding the male electrical plug portion in a female socket. These extension cords, called "twist lock" cords, prevent disconnection of the cord in case someone trips on the cord or the cord is otherwise unintentionally pulled from its socket connection to a power source, such as an electrical generator or a wall socket. When connecting a twist lock plug, the user inserts the plug into the receptacle and twists it to lock it in place to prevent it from being accidentally pulled from the receptacle. The difficulty is that the cross-section of the housing for a male twist lock plug is typically circular. Such configurations make it difficult to make a visual determination of whether the plug was properly twisted to lock it into the receptacle.

Additionally, construction workers and even casual residential users occasionally need to set up temporary power distribution for tools and use temporary lights to illuminate a room, work area, or work product. In some applications, the workers simply lay out a bunch of extension cords on the ground, which is dangerous because they are tripping hazards that the workers can fall over. The cords are also easily disconnected from one another and from their tools causing an unexpected loss of power. For lighting, the workers either plug in temporary lamps that rest on the floor, a table top, or create a temporary string of lights by hard wiring sockets to a pair of wires and hanging them from a ceiling or other structure. However, having to build a dedicated, hard wired light string is expensive and cumbersome.

SUMMARY

One aspect of this patent document is an electrical adapter comprising a male electrical plug. A female socket is electrically connected to the male electrical plug. At least one thermal indicator circuit is electrically connected to the male electrical plug and the female socket. The thermal indicator circuit is electrically positioned between an end of the male plug and an end of the female socket. The thermal indicator circuit is configured to actuate an alarm upon detecting a temperature at or above a threshold temperature without interrupting electrical flow between the male electrical plug and the female socket.

Another aspect of this patent document is an electrical adaptor comprising a housing. A male electrical plug comprises a prong extending from the housing and is configured as a standard 120-volt male plug. The prong comprises a distal tip, and the distal tip forms an end to the male electrical plug. A female socket is electrically connected to the male electrical plug and comprises an electrical contact positioned in the housing. The female socket is configured to receive a standard 120-volt male plug. The electrical contact comprises a distal tip, and the distal tip forms an end to the female socket. At least one thermal indicator circuit is electrically connected to the male electrical plug and the female socket and is electrically positioned between an end of the male plug and an end of the female socket. The thermal indicator circuit is configured to actuate an alarm upon detecting a temperature at or above a threshold temperature without interrupting electrical flow between the male electrical plug and the female socket.

DETAILED DESCRIPTION

Figure 1:
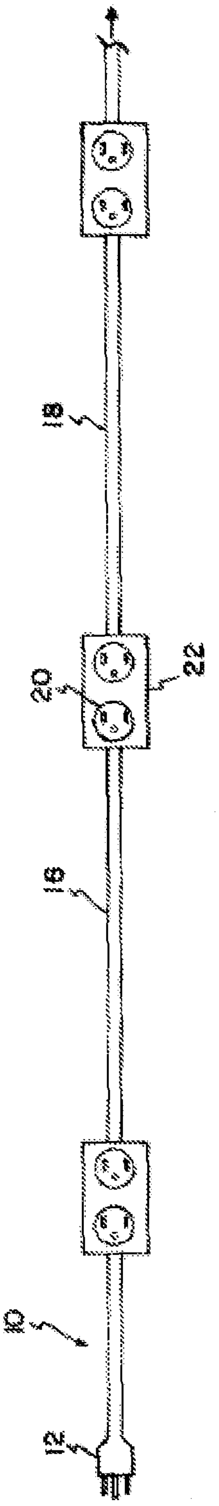
FIG. 1 is a front view of an extension cord showing a male plug, female sockets, and socket blocks of the cord, in which various aspects of the present disclosure can be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring to the drawings, FIG. 1 shows an exemplary extension cord 10 in which aspects of the present disclosure can be implemented. The exemplary cord 10 provides electrical connections at a plurality of locations along its length. The extension cord 10 includes a male plug 12 attached to one end within a housing 13, with socket blocks 22 housing female sockets 20 disposed along the cord.

The male plug 12 electrically connects to two or more conducting wires and an optional ground wire, as discussed herein. The conducting wires and optional ground wire are typically bound together into a single cord 16 that is covered by an insulated sheathing 18. The gauge of the conducting wires is chosen based on the length and expected use of the extension cord. Thicker wires are appropriate for longer cords and for cords used in heavy-duty applications that have large power requirements. Finer gauged wires are used for household extension cords.

Typically, the socket blocks 22, insulated sheathing 18, and the housing 13 of the male plug 12 are constructed from plastics or polymers. In one possible embodiment, the male plug 12, socket blocks 22, and insulated sheathing 18 are molded together to form one continuous piece. This continuously molded embodiment of the extension cord is desirable because of the elimination of joints between the sheathing and the plug or socket blocks. Such joints often weaken the cord integrity and may provide an avenue for the entry of moisture into the interior of the cord which may short or damage the conducting wires.

The socket blocks 22 reside at intervals along the length of the extension cord 10. These intervals are typically regular, but may also be irregular. Each socket block 22 houses two female sockets 20. In other possible embodiments, however, the socket blocks 22 house one female socket 20 or three or more female sockets 20. Yet other possible embodiments of the extension cord 10 include a mixture of sockets blocks containing different numbers of female sockets, such as one female socket in some of the socket blocks and two female sockets in other socket blocks.

Each of the female sockets 20 is an electrical socket that electrically connects to at least two wires in the cord 10. In a possible embodiment, one or more of the female sockets 20 is a twist lock socket, as described herein. In another possible embodiment, one or more of the female sockets 20 is a three prong socket and includes the optional ground wire. Additional embodiments of the extension cord described herein are discussed in U.S. Pat. No. 5,902,148, the entire disclosure of which is hereby incorporated by reference.

Safety devices reside at various locations along the extension cord 10, which is configurable for use with such devices. The safety devices reside at any of a variety of locations along the extension cord, although in some embodiments the devices reside near the male plug 12 or female socket 20 due to the propensity for electrical fault or failure occurrences in those locations. In a possible embodiment, the housing 13 for the male plug 12 encloses a safety device integrated with the extension cord 10. In another possible embodiment, the socket block 22 or other female connector housing encloses a safety device as well. In various embodiments, the housings 13 and socket block 22 enclose ground fault circuit interrupters. In other embodiments, the housings 13 and socket block 22 include a thermal or temperature indicator circuit formed by the combination of a thermal switch and an indicator, or some other heat sensing configuration. Additionally, the male plug 12 can include a male twist lock configuration, whether that configuration is a standard configuration or a non-round configuration as described in more detail herein. The female sockets 20 can include a female twist lock configuration, whether that configuration is a standard configuration or a configuration adapted to mate with a non-round male configuration as described in more detail herein.

In an application of the cord 10, light sockets can be plugged into one or more of the female sockets 20. The light sockets can include a clamp or other retaining member to secure the light socket to the female socket blocks 22. In one possible embodiment, the female socket 20 can include a detent that the clamp mates with and snaps into. Alternatively, the clamp or retaining member can be connected to the female socket 20 and receive the light socket. The light socket can include a basket or similar structure to protect a light bulb inserted in the light socket. One or more light sockets can also be packaged with the electrical cord 10 in a kit.

Examples of electrical connection configurations between the female sockets 20 and the conducting wires 14*a*-14*g* that include ground fault circuit interrupters 30 are provided in FIGS. 2A-2F.

Figure 2A:
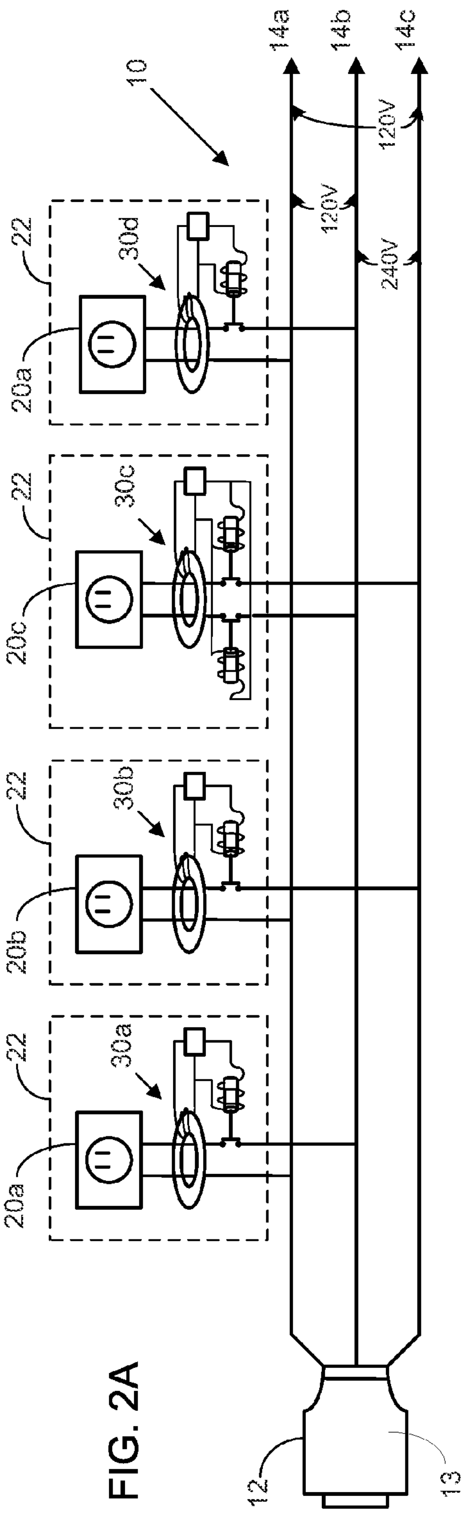
FIGS. 2A-2F are schematic views of various extension cords having integrated ground fault circuit protection.

One embodiment of the extension cord 10 of the present disclosure has three conducting wires and is illustrated in FIG. 2A. This extension cord 10 can be used, for example, with a single phase, three wire 120/240V service. Various embodiments of the extension cord 10 can be used with other service ratings as well, whether the service rating defines a voltage different than 120/240V, current capacity, phase, or any other operating characteristic. This type of service is often available in the United States as the primary connection from electrical transmission lines to residential and commercial properties. The extension cord includes three conducting wires 14*a-c* connecting the male plug 12 to the female sockets 20*a-c*. The female sockets 20*a-c* reside within socket blocks 22, which also include ground fault circuit interrupters 30*a-d*.

In this configuration, one of the conducting wires 14*a* is a neutral wire that is typically held at or near ground. The other two conducting or circuit wires 14*b*, 14*c* are held at about 120V above ground. These latter two wires are typically called “hot” or active wires because they provide a non-zero voltage drop across any grounded object. Each circuit wire is used to establish a separate circuit to which female sockets are attached.

Female sockets 20*a* and 20*b* are electrically connected to different active wires to create a cord 10 with two electrically isolated circuits. One or more female sockets 20*a* of extension cord 10 electrically connect in parallel to the neutral wire 14*a* and one of the 120V active wires 14*b*. One or more female sockets 20*b* electrically connect in parallel to the neutral wire 14*a* and the other 120V active wire 14*c*. Each of the female sockets 20*a*, 20*b* is capable of providing 120 volts to electrically operated devices plugged into that socket. In the embodiment shown, one female socket 20*a* or 20*b* is included in each socket block 22.

One or more female sockets 20*c* are capable of providing 240 volts, in addition to the female sockets 20*a* and 20*b* which provide 120 volts. The 240 volt female socket 20*c* electrically connects in parallel to both of the 120V active wires 14*b* and 14*c* (and not to the neutral wire 14*a*) and provides 240 volts because the 120V circuit wires are 180° out of phase. Many heavy-duty tools and appliances, such as clothes dryers, require 240 volts, while the majority of electrically operated devices in the United States operate with 120 volts. Only one cord 10 is needed to operate pieces of equipment that have different voltage ratings.

Each female socket 20*a-c* of FIG. 2A includes ground fault circuit interrupters 30*a-d* incorporated within each socket block 22. The ground fault circuit interrupters 30*a-d* detect sudden imbalances in current flow such as can be caused by grounding of the load. This happens, for example, by a user accidentally stepping in water or otherwise causing a grounding path. The ground fault circuit interrupters 30*a-d* couple across the parallel electrical leads branching from the neutral wire 14*a* and conducting wire 14*b*. Each ground fault circuit interrupter 30*a-d* includes a transformer 32, sense circuitry 34, one or more switches 36, and one or more solenoids 38. Operation of the components of the ground fault circuit interrupters 30*a-d* is discussed in greater detail below in FIGS. 3A-3B.

The ground fault circuit interrupters 30*a-d* electrically isolate the female sockets 20*a* and 20*b*. If ground fault circuit interrupter 30*a* senses a current imbalance to socket 20*a* within the same socket block 22, it interrupts current flow to that socket. Electrical connection to socket 20*a* associated with ground fault circuit interrupter 30*d* is not interrupted because it is formed from an electrical circuit parallel to the circuit disconnected by ground fault circuit interrupter 30*a*. An electrical tool is capable of being used if connected to any female socket 20*a-b* associated with the non-interrupting ground fault circuit interrupters 30*b-d*. Various embodiments also could include an arc fault interrupter in place of the ground fault circuit interrupter 30.

Figure 2B:
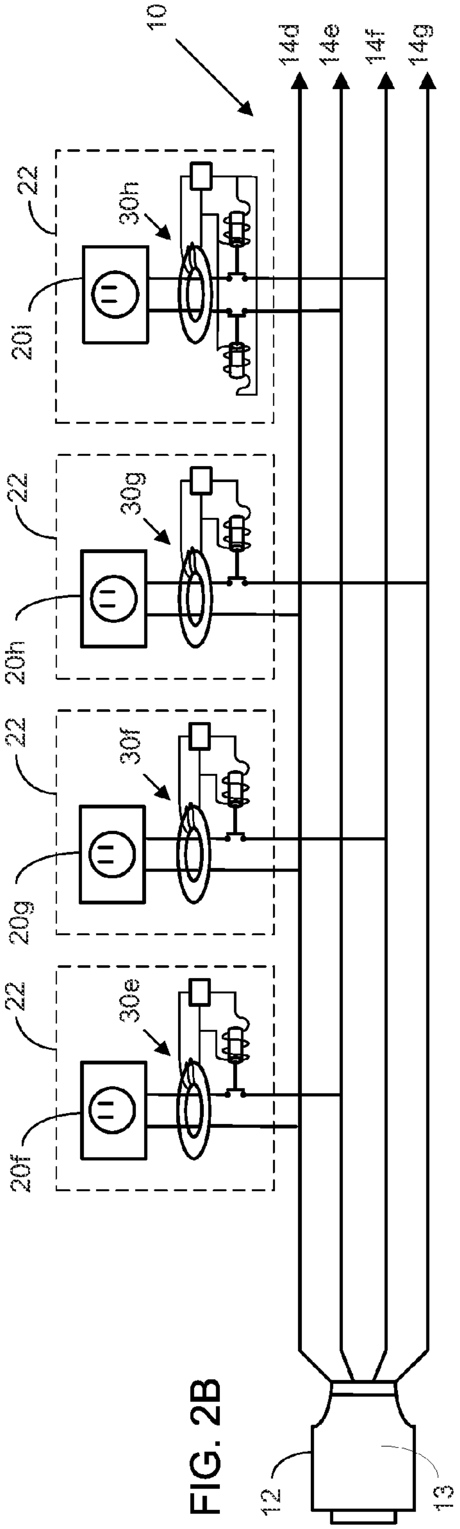
Figure 2C:
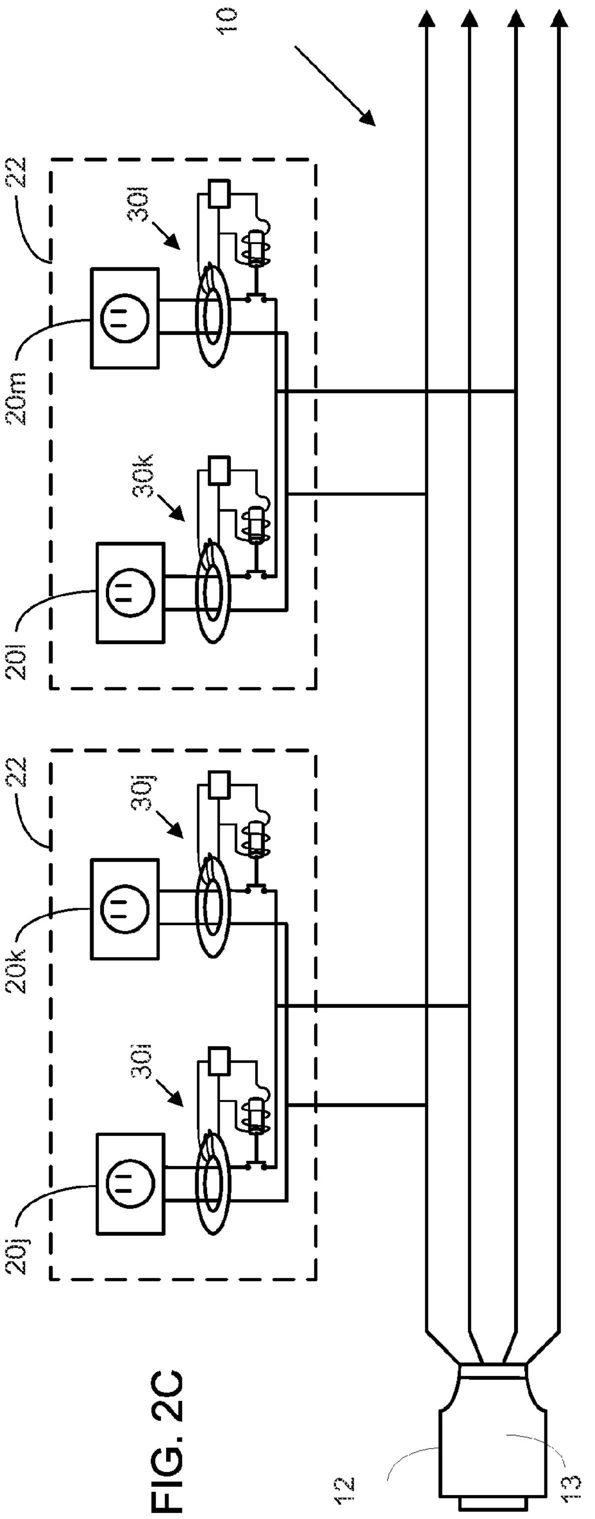
Figure 2D:
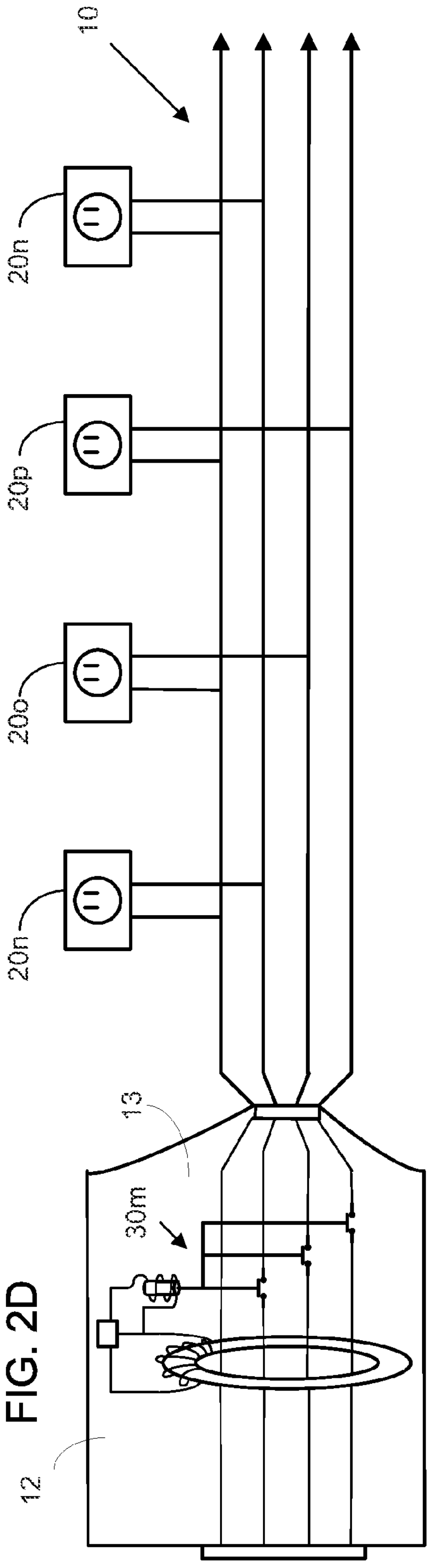

Extension cords 10 can also be made for use with voltage services other than the typical 120/240 volt service, and can include ground fault circuit interrupters in various locations along the extension cord. One example is a 120/208 volt service which is often configured as a three-phase, four-wire system. FIGS. 2B-2D illustrate alternative embodiments of cords for use with this type of service.

FIG. 2B shows an exemplary embodiment of a cord 10 for use with a four-wire service. The cord is substantially similar to the one described in conjunction with FIG. 2A, except that has a neutral wire 14*d* and three 120V conducting wires 14*e*, 14*f* and 14*g*. Three different 120V circuits can be made. One or more female sockets 20*f* electrically connect in parallel to neutral wire 14*d* and active wire 14*e*, one or more female sockets 20*g* electrically connect in parallel to neutral wire 14*d* and active wire 14*f*, and one or more female sockets 20*h* electrically connect in parallel to neutral wire 14*d* and active wire 14*g*. The four circuits corresponding to sockets 20*f*, 20*g*, and 20*h*, respectively, are electrically isolated due to these parallel connections. In one possible embodiment, an additional female socket 20*i* electrically connects in parallel between any two of the active wires 14*e*-14*g*, such as wires 14*e* and 14*f* shown. The socket 20*i* provides 208 volts to any electrically operated devices plugged into the socket. Ground fault circuit interrupters 30*e-h* are coupled across each socket 20*f-i*, and operate as described in conjunction with FIGS. 2A and 3A-B. As described above, each of the ground fault circuit interrupters 30*e-h* only disconnects electricity to the associated socket 20*f* and 20*g* due to the parallel connection to the conducting wires 14*d-g*.

In an alternative embodiment, the cord 10 has a separate neutral wire associated with each conducting wire 14*e*-14*g*. For example, a cord 10 having three conductors 14*d*-14*g* would also include three neutral wires. Each female socket 20 would have a contact connected between the conducting wire and the neural associated with that conducting wire.

FIG. 2C shows another possible embodiment of a cord 10 for use with a four wire service as described in conjunction with FIG. 2B. In this embodiment, each socket block 22 incorporates multiple female sockets 20*j*-*m*, which connect in parallel within each socket block 22 and to the conducting wires 14*d*-*g*. Separate ground fault circuit interrupters 30*i*-*l* are associated with each female socket 20*j*-*m*, respectively. In this configuration, one female socket 20 can be disabled within a socket block 22 by a ground fault circuit interrupter 30 while the other female socket within the same socket block 22 remains active. All female sockets 20 in the other socket blocks 22 also remain active.

In an alternate embodiment (not shown), one ground fault circuit interrupter can be included in each socket block, and is associated with two or more female sockets. In such a configuration, both sockets within the socket block disable upon detection of a fault by a ground fault circuit interrupter.

Figure 3A:
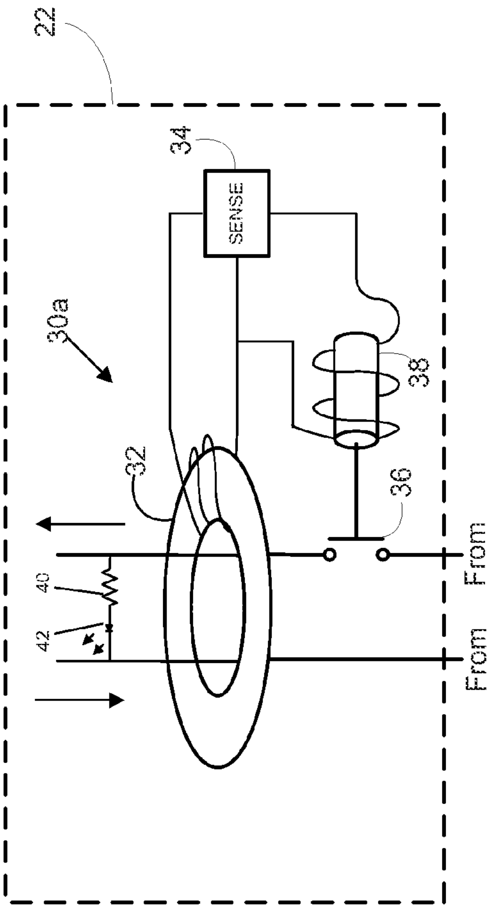
FIGS. 3A-3B are schematic views of circuit sections shown in FIG. 2A.
Figure 3B:
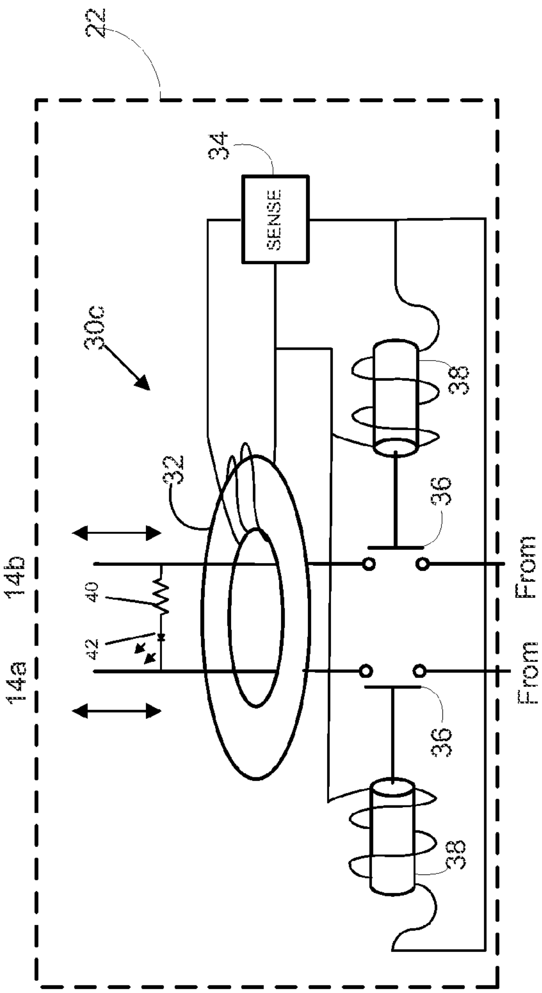

FIG. 2D shows a further possible embodiment of a cord 10 for use with a four wire service as described in conjunction with FIG. 3B. In this embodiment, female sockets 20*n*-*p* are distributed along the cord 10, and electrically connected to two of the wires 14*d*-*g*. A ground fault circuit interrupter 30*m* couples across the wires 14*d*-*g*, and resides within the housing 13 of the male plug 12. In this configuration, the ground fault circuit interrupter 30*m* detects a zero sum current across all of the conducting wires 14*e*-*g* and the neutral wire 14*d*. Upon detection of a current change, the ground fault circuit interrupter 30*m* disconnects the conducting wires 14*e*-*g*, deactivating all of the sockets 20*n*-*p* along the cord 10.

Figure 2E:
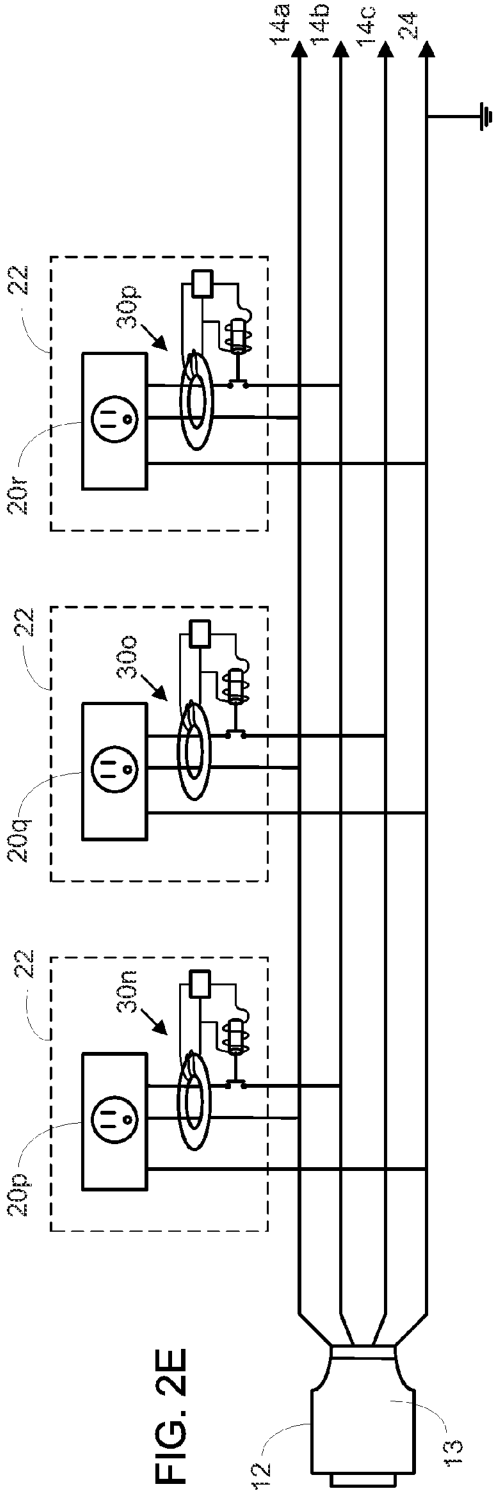
Figure 2F:
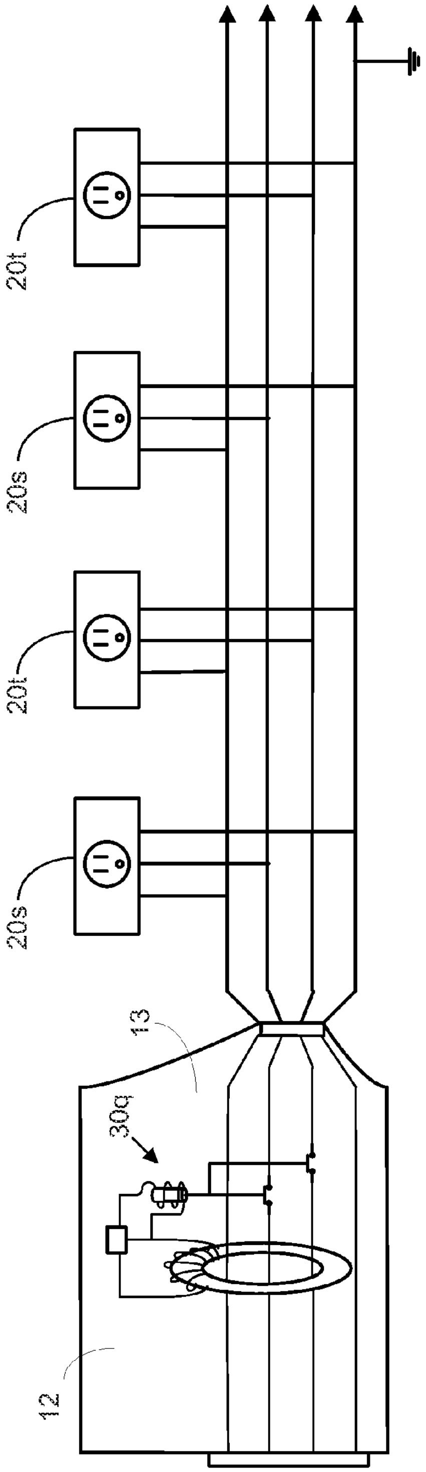

Two further embodiments are depicted in FIGS. 2E and 2F which include a grounding wire 24 incorporated into the extension cord 10. Typically, grounding wire 24 is locally grounded as opposed to being grounded at the power source as is often the case for neutral wire 14*a* of FIG. 2A or wire 14*d* of FIGS. 2B-2D.

In FIG. 2E, the extension cord 10 incorporates a number of female sockets 20*q* electrically connected to a neutral wire 14*a*, a 120V conducting wire 14*b*, and a grounding wire 24. The extension cord 10 also incorporates a number of female sockets 20*r* electrically connected to the neutral wire 14*a*, the other 120V conducting wire 14*c*, and the grounding wire 24. Each female socket 20*q*, 20*r* resides within a separate socket block, although it is understood that two or more female sockets can be incorporated in each socket block consistent with the principles described above in FIG. 2C.

The socket blocks 22 each include ground fault circuit interrupters 30*n*-*p* coupled across the parallel connections to female sockets 20*p*-*r*, which reside within the socket blocks 22. This configuration corresponds to the configuration of FIG. 2A, with inclusion of grounding wire 24. The ground fault circuit interrupters 30*n*-*p* are not coupled across the parallel connection to the grounding wire 24. Current within the grounding wire 24 is therefore not detected using the ground fault circuit interrupters 30*n*-*p*.

FIG. 2F has a similar three wire configuration to FIG. 2E, and also includes grounding wire 24. Ground fault circuit interrupter 30*q* couples across and detects a zero sum across all of the conducting wires 14*b*-*c* and the neutral wire 14*a*. Current within the grounding wire 24 is not detected using the ground fault circuit interrupter 30*q*. Upon detection of a fault, the ground fault circuit interrupter 30*q* disconnects the electrical supply to all of the female sockets 20*s*-*t*.

The extension cords 10 of the present disclosure, especially those with electrically isolated circuits, are especially useful when heavy power drawing devices or many electrically operated devices are attached to the extension cord. The power load from these devices can be balanced between the two or more isolated circuits so that a single extension cord can be used where two or more extension cords would otherwise be required. By balancing the power load between the isolated circuits, devices may be plugged into a single extension cord and draw power which, when plugged into a typical one circuit cord would otherwise result in tripping a fuse attached to the outlet or the cord; damage the cord or the equipment plugged into it; or even causing a fire. Balancing the power load between the multiple circuits of the extension cord permits more equipment to be operated safely with a single extension cord. Ground fault circuit interruption associated with either the male plug or the female sockets of the extension cords 10 provides additional safety to each female socket 20. By incorporation of ground fault circuit interruption with each female socket, operation of all devices connected to the cord 10 is not interrupted upon detection of a fault at one female socket.

Alternatively, if the cord 10 has a separate neutral for each conducting wire, an embodiment can include a separate ground fault interrupter circuit for each separate circuit or pair of conductor and neutral wire. For example, if there are two conductors and two matching respective neutral wires, the cord can include two separate ground fault interrupters 30. Thus if one circuit fails, the other circuit may still be operating and conducting electricity.

The alternative embodiments shown in FIGS. 2A-2F are merely illustrative. It will be recognized that the same principles can be used to construct extension cords and distribute ground fault circuit interrupters across the cords for any voltage service that has two or more conducting wires. In addition, all of the female sockets represented in each of FIGS. 2A-2F are not necessary for a cord constructed according to the principles of the present disclosure. For example, an extension cord can be constructed similar to the embodiment depicted in FIG. 2A by including only female sockets 20*a* and 20*b*. Such a cord would have two electrically isolated circuits, one of which would provide 120V service and the other 240V service. Extension cords can be constructed having any combination of female sockets connected to different conducting wires and any combination of female sockets within a single socket block. One or more of the electrically isolated circuits or female sockets can include ground fault circuit interrupters, in various configurations as shown above, or a combination thereof.

Ground fault circuit interrupters operate in electrical installations to disconnect a circuit when imbalanced current flow is detected between a conducting wire and a neutral wire. GFI's open the circuit because an imbalance might represent current through a person who is accidentally touching the energized part of the circuit and is therefore about to receive a potentially lethal shock. GFI's include a normally closed switch connected to sense circuitry that is designed to open and disconnect electricity quickly enough to prevent such shocks. FIGS. 3A and 3B shows exemplary schematic views of portions of the extension cord 10 of FIG. 2A including ground fault circuit interrupters 30*a* and 30*c*.

FIG. 3A shows ground fault circuit interrupter 30*a* residing within the socket block 22 and coupled across conducting wire 14*b* and neutral wire 14*a*. The ground fault circuit interrupter includes a transformer 32, sense circuitry 34 electrically connected to the transformer 32, and a switch 36 and solenoid 38 connected to the transformer 32 and sense circuitry 34.

The transformer 32 detects current within both the conducting wire 14*b* and the neutral wire 14*a*. In normal operation, all of the current flowing along the conducting wire 14*b* returns along neutral wire 14*b*. This causes a balanced current state within the cord 10, and does not induce any current in the transformer 32. In the case of a sudden change in current flow, for example caused by a person touching a live component in the attached appliance, some of the current takes a different return path. This results in an imbalance in the current flowing in the conductors 14*a* and 14*b* or, more generally, a nonzero sum of currents from among multiple conductors. This difference causes a current to flow in the transformer 32.

The sense circuitry 34 detects current flowing to it from the transformer 32. The sense circuitry 34 activates the solenoid 38, which in turn disconnects the switch 36, which in turn disconnects the conducting wire 14*b*. Disconnecting the switch 36 opens the circuit defined by the leads 14*a-b* by disconnecting the conducting wire 14*b*. The electricity supply to the circuit is interrupted, preventing potential electrocution.

In a possible embodiment, optional resistor 40 and light emitting diode 42 connect between the conducting wire 14*b* and the return wire 14*a*. The resistor 40 and light emitting diode 42 form an indicator circuit configured to illuminate the light emitting diode while the circuit connected to the socket block 22 remains active. In an alternate embodiment, the light emitting diode 42 is replaced by an incandescent bulb or other illumination device. In still other embodiments, all or a portion of the socket block 22 is formed from a translucent material, and illuminates while the light emitting diode 42 remains illuminated.

FIG. 3B shows a ground fault circuit interrupter 30*b* coupled across conducting wires 30*b-c*. The ground fault circuit interrupter 30*b* operates similarly to the ground fault circuit interrupter 30*a* of FIG. 3A, but is designed with switches 36 and solenoids 28 connected to the sense circuitry 34 to disconnect both of the conducting wires 14*b* and 14*c* upon detection of imbalanced current flow. Such a configuration is useful for multiphase power connections because it prevents accidental power transmission if the load connected to the female socket is accidentally grounded.

The ground fault circuit interrupters are designed so that the current is interrupted in a very short time after the imbalanced current is detected, such as a fraction of a second. This greatly reduces the chances of an electric shock being received.

In additional possible embodiments ground fault circuit interrupters 30 can sense current changes among more than two wires, and may require different electrical connections depending upon the configuration used. For example, a multiphase conducting wire cord may require more than one switch 36 connected to the sense circuitry 34. For clarity, the basic schematics shown in FIGS. 3A-3B are used throughout the present disclosure, but are understood to represent additional possible configurations of ground fault circuit interrupter wiring.

Figure 4:
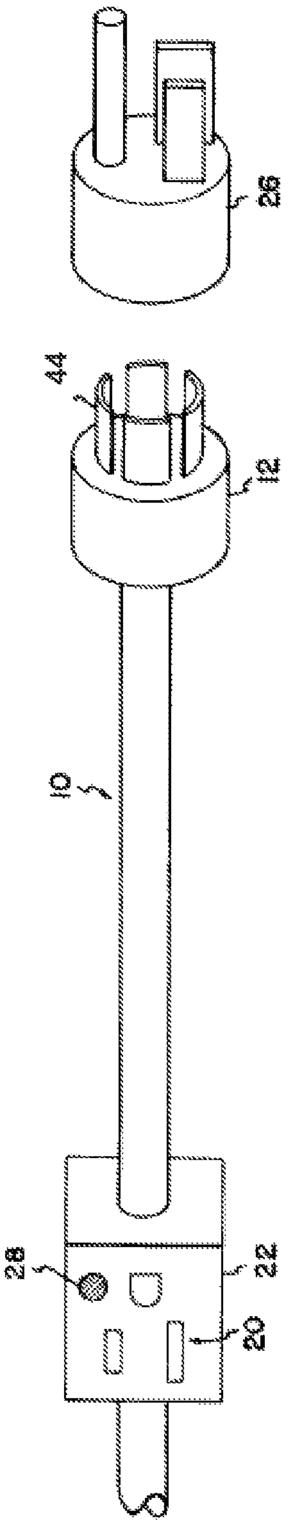
FIG. 4 is a perspective view of an alternative embodiment of the extension cord shown in FIG. 1 having an optional adapter for the male plug of the extension cord.

Referring now to FIG. 4, a female socket 20 for use with a standard U.S. 120V male plug from an electrically operated device is shown. In this embodiment, the male plug 12 of the extension cord 10 has four prongs 44 and is configured for attachment to a 120/240V service. One common configuration for a male plug 12 to be used with a 120/240V service is a twist lock plug where the plug is inserted into an appropriate female outlet, not shown, and then the male plug is twisted to securely fasten the prongs 44 of the plug within the outlet. This type of male plug configuration ensures that the plug 12 does not come out of the outlet by simply pulling on the plug 12. Although the plug 12 shown includes four prongs 44, plugs with any number of prongs can be used in this twist lock configuration.

An optional adapter 26 may be provided for adapting this embodiment of the extension cord for use with a 120V source. This adapter 26 has a female portion configured to receive the male plug 12 of the extension cord 10 and a male portion for plugging into a female outlet of a 120V source. If such an adapter were used, for example, with the extension cord configuration of FIG. 2A, the adapter would include an electrical connection between the two 120V conducting wires 14*b* and 14*c* so that they would be attached to the same prong of the adapter. When using this adapter the electrically operated devices plugged into the extension cord will all be part of the same circuit despite using coupling configurations illustrated in FIG. 2A due to the connection of the two circuit wires in the adapter. Furthermore, instead of being a separate attachment, the adapter may alternatively be integrally coupled to the cord 10.

Other adapters may be provided for conversion between extension cords of the present disclosure and other voltage source configurations. In addition, adapters may be provided that will convert the prong configuration of the male plug of the extension cord to an appropriate configuration for use in another country or region.

Figure 5B:
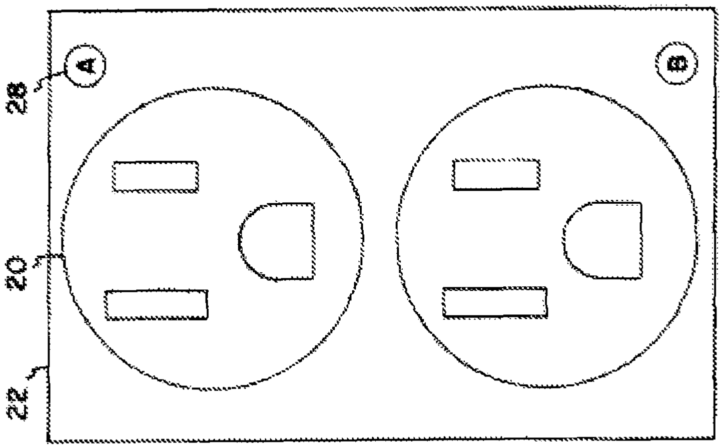
FIGS. 5A and 5B are front views of alternative socket block configurations having circuit identifying marks for use with the extension cord shown in FIG. 1.
Figure 5A:
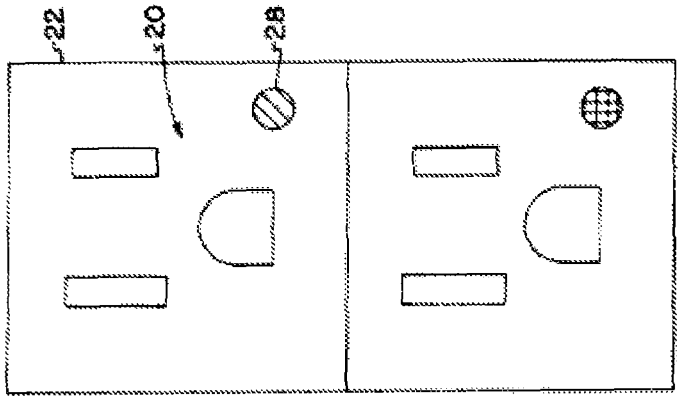

FIG. 5A shows a socket block 22 with rectangular female sockets 20. FIG. 5B shows a socket block 22 with circular female sockets 20. Other socket and socket block configurations are possible.

In one possible embodiment, a circuit identifying mark 28 is provided proximate each of the female sockets 20. The circuit identifying mark 28 may be color-coded (see FIG. 5A), numbered, lettered (see FIG. 5B), stamped, or otherwise configured to indicate the circuit to which the proximate female socket is attached. The circuit identifying mark 28 provides an extension cord user with information about which circuit the device is being plugged into so that the user may balance the power load of the circuit.

In another possible embodiment, the circuit identifying mark 28 is a light emitting diode or other illumination device. The light emitting diode is configured to illuminate upon connection of a male plug to the female socket 20, and is color coded to the circuit corresponding to that socket.

FIGS. 5A and 5B both show socket blocks 22 for use with extension cords in which the two female sockets 20 of the socket block 22 are each attached to different circuits. However, other configurations are also possible including having the female sockets 20 of each socket block 22 attached to the same circuit or alternatively, having more than one female socket in each socket block attached to the same circuit. For example, in one embodiment, not shown, two out of four female sockets in a socket block are attached to one circuit with the other two sockets attached to a second circuit.

Figure 6:
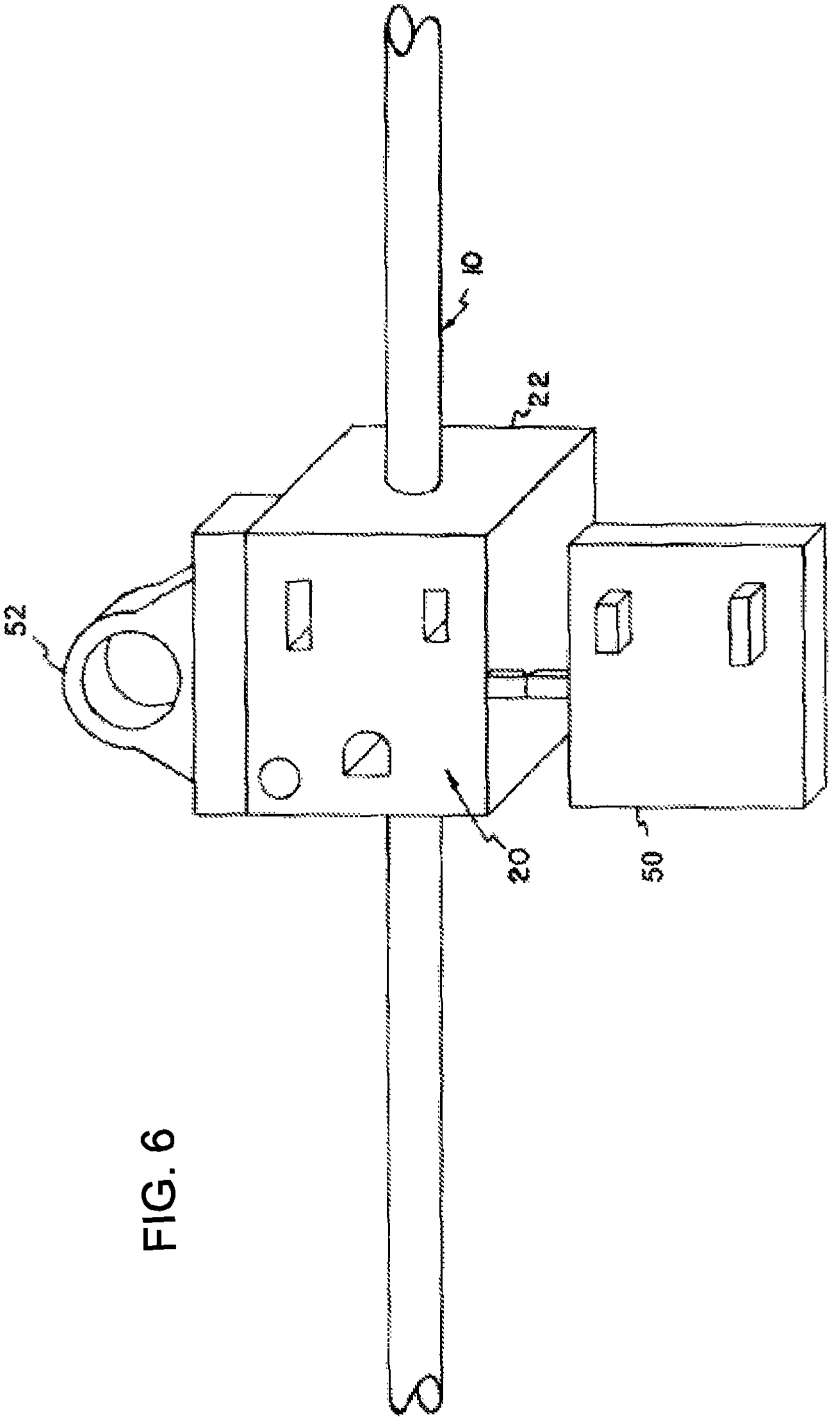
FIG. 6 is a perspective view of a female socket and socket block with an optional cap and an optional mooring member.

FIG. 6 shows another alternative embodiment. In this embodiment one or more of the female sockets 20 have a cap 50. Typically, there is a cap 50 for each female socket 20. The cap 50 and female socket 20 are configured so that the cap 50 can be placed on or into female socket 20 when the female socket 20 is not in use. The cap 50 provides a safety mechanism for the extension cord 10 to avoid unwanted contact between the active conducting wires 14*a*-14*g* of the extension cord 10 and individuals, moisture, or other external objects.

Figure 7:
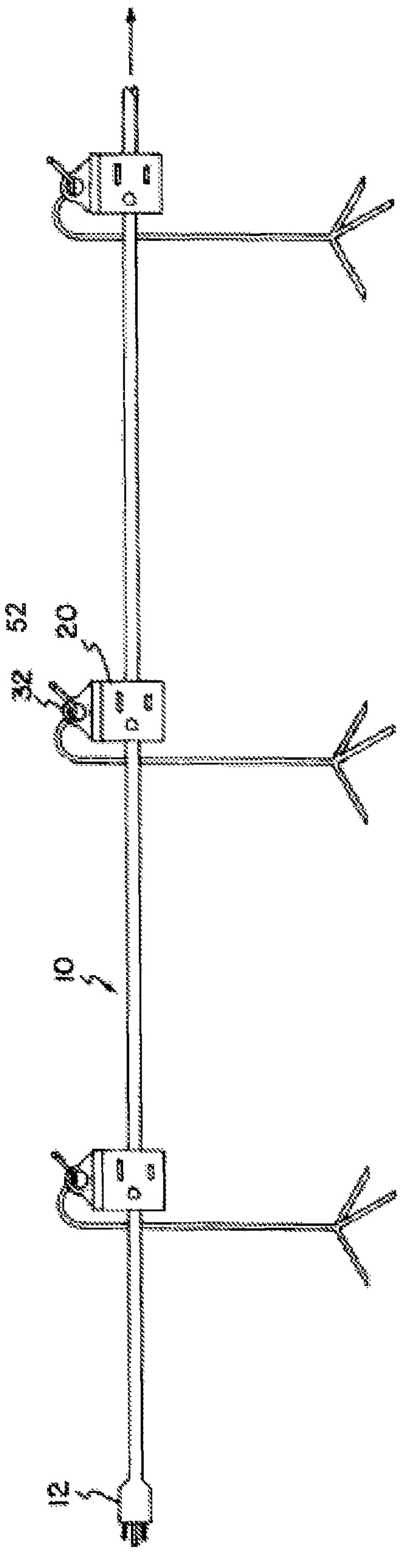
FIG. 7 is a front view of the extension cord shown in FIG. 5 being held off the ground by use of mooring members attached to the socket blocks of the cord.

Additionally, a mooring member 52 is attached to either the female sockets 20 or the socket blocks 22 which can be used to hold the extension cord 10 in place. For example, the mooring member 52 may be used to fasten the extension cord 10 in a desired place or position or to hold the extension cord 10 off the ground, as depicted in FIG. 7. The mooring member may be a loop or ring of material. Alternatively, the mooring member may be a hook, strap, bracket, slot, or similar device which will permit attachment of the cord to an external object. The mooring member 52 may be used with any extension cord, not only those with multiple circuits. In one embodiment, the mooring member is integrally molded to the socket or socket block to provide a stable and durable structure.

In an alternative embodiment, the extension cord is made of a male plug, two or more conducting wires electrically connected to the male plug, and one or more female sockets electrically connected to the conducting wires with a mooring member attached to the female sockets or to a socket block which houses the female sockets. In this embodiment, the female sockets may all be electrically connected to the same conducting wires, or alternatively, they may be electrically connected to different conducting wires.

Figure 8A:
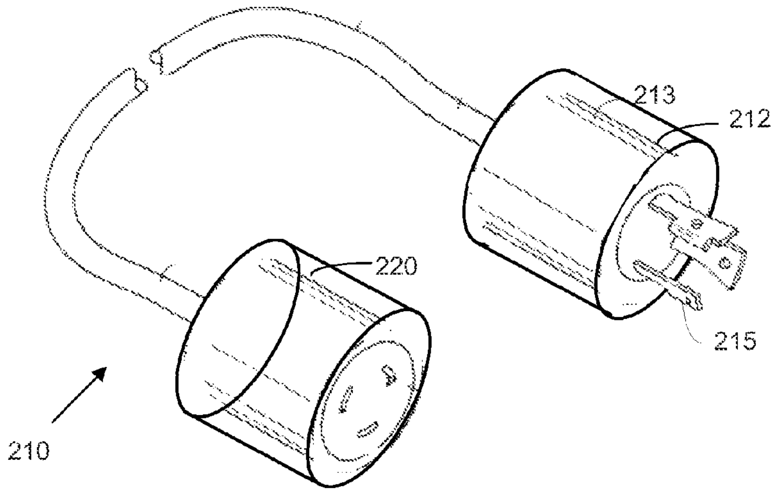
FIG. 8A is a perspective view of a prior art twist lock cord.

FIG. 8A shows an extension cord 210 including a male twist lock plug 212. The extension cord 210 can be used in construction or other high voltage applications. The cord 210 has a male twist lock plug 212, which includes a housing 213. The cord also includes a female twist lock socket 220, configured to mateably receive a male twist lock plug 212. In use, a male twist lock plug 212 is inserted into a female twist lock socket 20, and axially rotated (either clockwise or counterclockwise, depending upon the configuration of the plug and socket) into a locked position. Removal of the male plug 212 from the female socket 220 requires twisting the male plug 212 in the opposite direction.

The male twist lock plug 212 includes a plurality of prongs 215 formed in a circular configuration to lockably mate with a female socket 220. The male twist lock plug 212 is twisted to securely fasten the prongs 215 of the plug 212 within the outlet.

The male twist lock plug housing 213 has an oval cross-sectional shape at its face or at any other point within the housing 213. The oval shape of the housing 213 indicates the rotational position of the plug, which in turn dictates whether the plug 212 is in a locked or unlocked position when inserted into a female socket 220. In various embodiments, the plug 212 can be other non-circular shapes. Although the plug 212 can retain a circular configuration of the prongs 215, the housing 213 can have a triangular, rectangular, or any other cross sectional shape capable of indicating the rotational position of the plug 212. In further embodiments, the male twist lock plug 213 includes an indicator which corresponds to an indicator on a corresponding female twist lock socket 220. Alignment of the indicators can indicate a locked or unlocked position of the male twist lock plug 212.

The female twist lock socket 220 optionally has an oval cross-sectional shape as well. The oval shape of the female twist lock socket 220 aligns with the oval cross sectional shape of a male twist lock plug housing 213 when in either a locked or unlocked position.

Figure 8B:
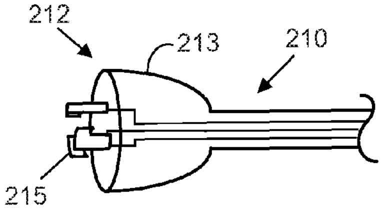
FIG. 8B is a perspective side view of a male connector for a twist lock cord.

FIG. 8B shows a perspective side view of a section of an electrical cord 210 including a male twist lock plug 212 with a housing 213 having an oval cross-sectional shape as described in FIG. 8A. Each of the plurality of prongs 215 connects to an internal conductor, such as the conducting or neutral wires 14 of FIGS. 2A-2E. The housing 213 has a variable-sized oval cross section, which indicates the rotational position of the plug, showing whether the plug 212 is in a locked or unlocked position when inserted into a female socket 220.

Figure 8C:
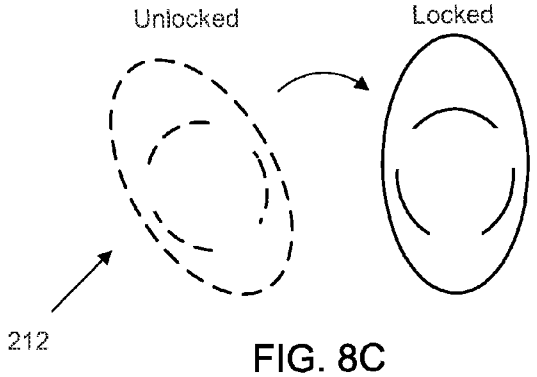
FIG. 8C is a functional schematic view of showing locked and unlocked positions of the male twist lock connector shown in FIG. 8B.

FIG. 8C shows a schematic functional view of a section of an extension cord including a male plug 212 according to an embodiment of the present disclosure. The non-circular cross-section of the housing 213 enables a user to readily ascertain whether the plug is in a locked position. In the embodiment shown, the oval plug is inserted in an askew position, shown in FIG. 8C in dotted lines. The askew position corresponds to an unlocked, or insertion position. When the plug 212 is fully inserted and twisted to the locked position, the oval shaped housing 213 is upright, allowing a user to readily determine the locked status of the plug 212. Alternately, the housing 213 can be in a locked position at a different ascertainable rotational position.

Figure 9A:
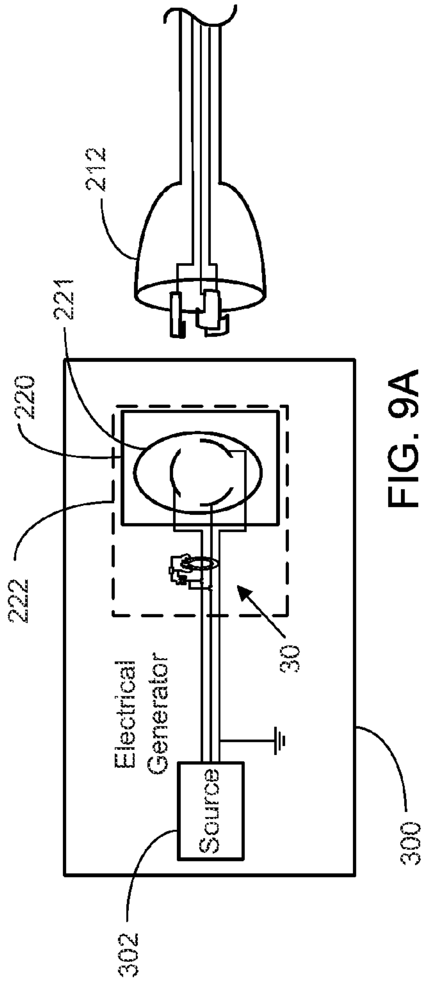
FIG. 9A-9B are schematic views of electricity distribution from an electrical generator.
Figure 9B:
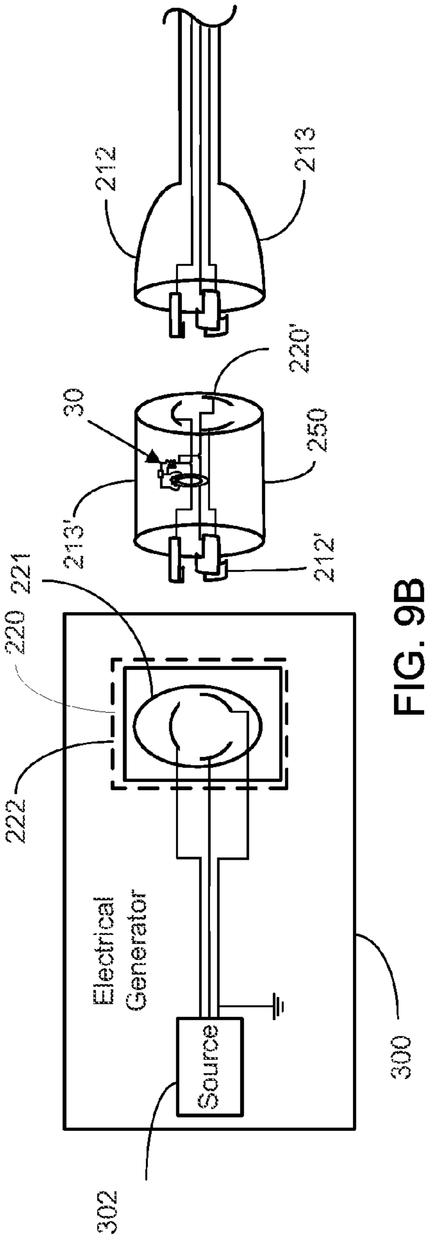

FIGS. 9A and 9B show schematic views of the male twist lock plug 212 used in conjunction with a female socket 220 incorporated into an electrical generator 300. The electrical generator 300 provides a power source 302 that can be used at a construction site, a home, or other location where a portable or backup power supply is desired. The electrical generator 300 generates an electrical current which passes through an electrical cord 210 associated with the male twist lock plug 212 when the cord is connected to the electrical generator. Socket orientation indicia 221 located on a visible face of the socket 220 and/or socket block 222 indicates the locked state, the unlocked state, or both the locked state and the unlocked state of the combination of the male plug 212 and female socket 220. The socket orientation indicia 221 can include an outline displaying the cross-sectional shape of the male housing 213 when in the locked and/or unlocked positions.

Additional configurations of the socket orientation indicia 221 are possible as well. For example, a colored indicator located on the male plug can align with a colored indicator on the female socket when in a locked and/or unlocked position. In another alternative embodiment, the socket orientation indicia 221 is defined by a portion of the face of the socket block 222 (or on the face plate enclosing the female socket) that is raised, elevated, or otherwise set-off relative to adjacent portions of the socket block or surrounding structure. The profile of the raised portion of the face plate would match the profile for the face of the male twist lock plug 212.

The female socket 220 can optionally be located within a socket block 222 incorporated into the electrical generator 300. As shown in FIG. 9A, the socket block 222 can include a ground fault circuit interrupter 30 associated with the female socket 220. In such a configuration, the ground fault circuit interrupter 30 provides global ground fault protection to any electrical cord plugged into the female socket 220.

FIG. 9B shows socket block 222 incorporated into the electrical generator 300 and including a female twist lock socket 220 including socket orientation indicia 221. A socket adapter 250 includes a male plug 212' used to connect to a twist lock female socket, such as the socket 220 integrated with the electrical generator 300. The socket adapter further includes a female plug 220' that can accept other male twist lock plugs, such as the male plug 212 connected to the electrical cord 210.

Connection wires connect the male plug 212' to the female socket 220' within a housing 213' of the socket adapter 250. The socket adapter 250 can optionally include a ground fault circuit interrupter 30 electrically connected between a male plug 212' and a female socket 220'. The ground fault circuit interrupter 30 resides within the housing 213' of the socket adapter 250.

Figures 10A, 10B, 10C:
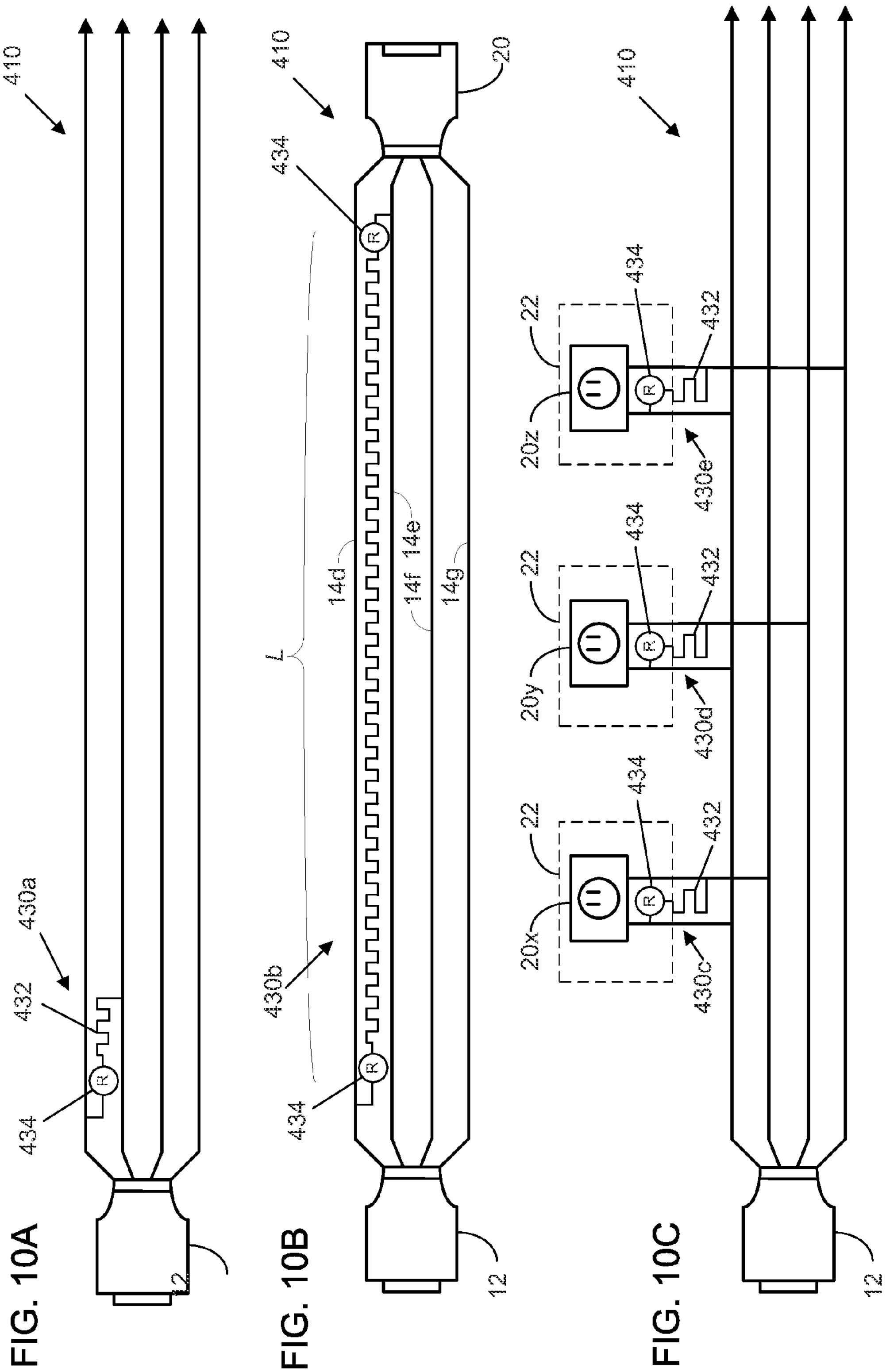
FIGS. 10A-10D are schematic views of various extension cords having integrated thermal failure detection.

FIGS. 10A-10D show schematic views of an extension cord 410 incorporating a thermal indicator circuit according to various embodiments of the present disclosure. FIG. 10A shows the cord 410 including a thermal indicator circuit 430*a* located near a male plug 12. The cord 410 correlates to the cord 10 of FIG. 3B, in that a four wire configuration is shown. The thermal indicator circuit 430*a* includes a thermal switch 432 and an indicator 434.

The thermal indicator circuit 430*a* connects across a conducting wire 14*e* and a neutral wire 14*d* in the extension cord 410. Additional thermal indicator circuits can connect between the neutral wire 14*d* and other conducting wires 14*f-g*, or between two conducting wires. The inclusion of a thermal indicator circuit 430 does not depend upon the specific configuration of the extension cord 410; two, three, or four or more wire cords can include thermal protection. In various embodiments, the thermal indicator circuit 430*a* can be located within a housing 13 of the male plug 12 and/or the thermal indicator circuit can be located along the extension cord 410.

The thermal switch 432 activates the thermal indicator circuit 430 when a temperature above a specific temperature is detected. In an exemplary embodiment, the thermal indicator circuit 430 is activated without interrupting electrical flow along the electrically conducting wires. For example, as an extension cord wears, added electrical resistance occurs at the wear areas of the cord 410. This added electrical resistance causes heat. Because cord degradation typically occurs near plug and socket connections, fires and other thermal hazards generally occur in these places as well. The thermal indicator circuit 430 provides a warning to a user of the cord 410 that potentially unsafe temperatures exist within potentially problematic locations within the cord. While the thermal indicator circuit 430 provides the warning, the electrical flow along the electrically conducting wires continues to run and is not interrupted, although other embodiments can include a switch or other mechanism to open the circuit in the event the thermal indicator is tripped.

In one embodiment, the thermal switch 432 is a thermistor, such as an NTC switching thermistor. In an exemplary embodiment, a thermistor such as an NTC switching thermistor, detects a specific temperature using the following generalized equation (1):

$$T = \frac{1}{a + b\ \ln R + c(\ln R)^3} \tag{1}$$

where a, b, and c are device-specific parameters, T is the temperature, and R is the resistance of the thermistor. The threshold value for the resistance is selected to correspond to a temperature value at or below a temperature limit for safe operation of the extension cord 410. When the temperature reaches the threshold, the resistance reaches a low enough level that the circuit is considered to be a "closed" circuit. Other temperature sensitive switches can be used as well. Although equation (1) is presented in this disclosure, various embodiments may operate according to physical and mathematical principles other than those described by equation (1).

The thermal switch 432 generally operates to connect a circuit upon detection of a minimum temperature. Thermal switches can include thermistors, which are variable-resistance resistors, whose resistance changes according to its temperature. In one possible type of thermistor, a negative temperature coefficient (NTC) thermistor, a decrease in resistance occurs as temperature increases. The thermistor can be made from a semiconducting material, such as a metal oxide. Raising the temperature of such a thermistor increases the number of charge carriers in the thermistor. The more charge carriers that are available, the more current that can be conducted, and the lower the resistance of the material. In another possible type of thermistor, a positive temperature coefficient (PTC) thermistor, an increase in resistance occurs as temperature increases. Thermal switches generally use a switching thermistor (either NTC or PTC), which means that the resistance of the thermistor either rises or falls suddenly at a certain critical temperature. This critical temperature is the critical temperature at which the thermal switch changes state. Other embodiments can include a thermal switch other than a thermistor.

The indicator 434 is an electrically activated indicator perceptible to a user of the cord, and indicates when the temperature reaches a specific threshold and the thermal switch 432 reaches its "closed" state. The indicator 434 activates upon activation of the thermal switch 432. The indicator 434 can include a light, such as a light-emitting diode, incandescent bulb, or other display or illumination device. The indicator 434 can also include a fuse or circuit protection device. The indicator 434 can include an audible alarm. A combination of indicators can be used in combination as well, such as multiple lights, a light and an audible alarm, a light and a fuse, or other configurations. Additionally, a light can be positioned within a housing that is at least partially translucent.

FIG. 10B shows the cord 410 including a thermal indicator circuit 430*b* that reaches across the entire length L of the cord 410. The thermal switch 432 spans the length of the cord 410, and can include one or more indicators 434, such as one indicator at each end of the cord 410. The thermal switch 432 activates the thermal indicator circuit 430*b* by activating the indicators 434 upon detection of the threshold temperature (or higher) at any location along the cord 410. In a further embodiment, the thermal indicator circuit 430*b* spans less than the entire length L of the cord 410.

In the embodiment shown, both indicators 434 are the same type of indicator. However, in alternate embodiments various types of indicators can be used in combination, such as an audible alarm and a light emitting diode, or other combinations. In yet another possible embodiment, the indicators are replaced by or positioned in electrical series with a relay having contacts in line with conducting wire 14*e* and an armature activated by the thermal switch 432. When the thermal switch 432 is tripped, the armature moves the contacts and creates an open circuit in the conducting wire 14*e*.

FIG. 10C shows the cord 410 including multiple separate circuits including female sockets 20*x-z*, and corresponds to FIG. 3B, above, in that it shows an embodiment of a cord 410 for use with a four-wire service and including a number of socket blocks 22 dispersed along the cord 410. Each socket block 22 contains one or more female sockets 20*a-c*, which can be configured in a manner as described in conjunction with FIG. 3. Thermal indicator circuits 430*c-e* reside near each socket block 22, with at least a portion of the thermal switch 432 located near the junction of the socket block 22 with a flexible portion of the cord 410 due to the high probability of wear at those locations. The thermal indicator circuits 430*c-e* detect thermal degradation near each socket block 22, such that a user of the cord 410 can choose to continue use of the cord 410 after one socket block 22 becomes unsafe by switching to a separate electrically isolated socket block. The indicator 434 can reside within or be located separate from the socket block 22.

In an alternate configuration, a thermal indicator circuit 430*a* can be located proximate to the male plug 412, and is used in conjunction with the thermal indicator circuits 410*c-e* located near the female sockets 20*x-z*.

Figure 10D:
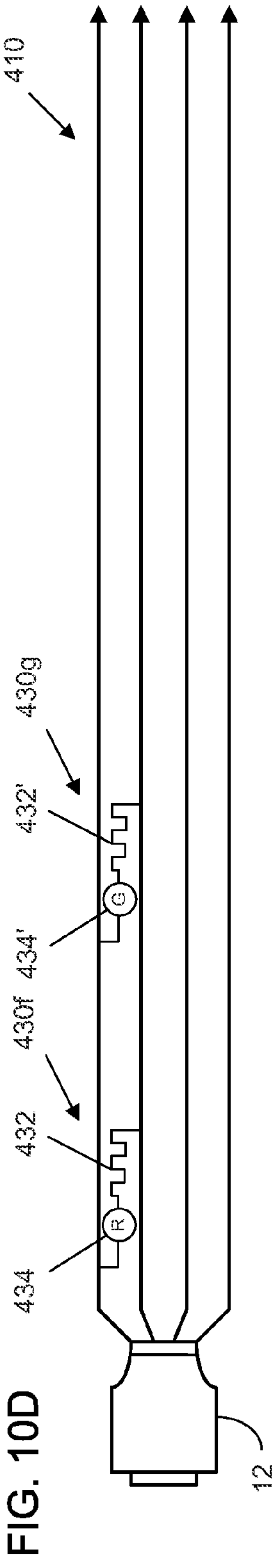

FIG. 10D shows the cord 410 including two thermal indicator circuits 430*f-g*. FIG. 10D corresponds to FIG. 10A, but includes a second thermal indicator circuit 430*g* having different operation from the first thermal indicator circuit 430*f*.

Thermal indicator circuit 430*f* includes a thermal switch 432 and an indicator 434. Thermal indicator circuit 430*g* includes a thermal switch 432' and an indicator 434'. Thermal switches 432 and 432' can differ based on threshold temperature, normal state (open or closed), or other factors. Indicators 434 and 434' can be either the same or different indicators selected from among the possible indicators described above in conjunction with FIG. 10A.

In a first possible embodiment, second thermal indicator circuit 430*g* is a warning circuit, and has a thermal switch 432' with a lower threshold temperature than thermal switch 432 of thermal indicator circuit 430*f*. A user of such a device is provided two levels of severity warnings for use of the electrical cord 410. In various other embodiments, the thermal switch 432' has inverse operation to the operation of thermal switch 432. In one implementation of this embodiment, thermal switch 432 is an NTC thermistor and thermal switch 432' is a PTC thermistor, and both switches 432, 432' have the same threshold temperature. The circuit 430*g* remains normally connected, activating indicator 434'. When the temperature of the cord exceeds the threshold temperature, thermal switch 432' opens and deactivates indicator 434' in thermal indicator circuit 430*g*, and thermal switch 432 closes and activates indicator 434 in thermal indicator circuit 430*f*. In a possible embodiment, indicator 434' can be a green light emitting diode and indicator 434 can be a red light emitting diode. Illumination of the green light emitting diode indicates safe operation of the cord 410, and illumination of the red light emitting diode indicates hazardous operation of the cord 410. Other configuration of indicators and threshold temperatures are possible as well.

Figures 11A, 11B, 11C:
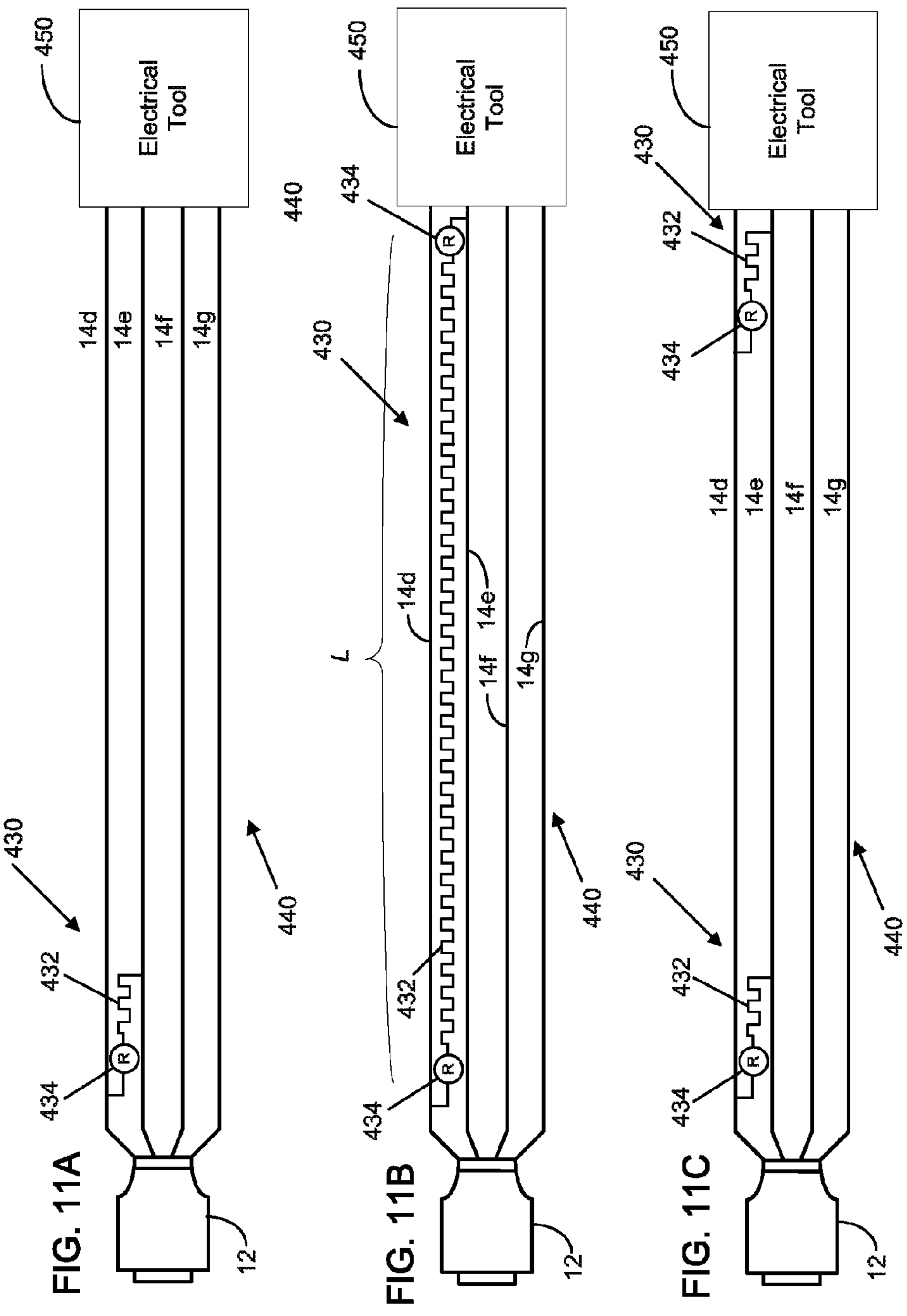
FIGS. 11A-11C are schematic views of various electrical cords having integrated thermal failure detection.

FIGS. 11A-11C show schematic views of various embodiments of an electrical cord 440 incorporating a thermal indicator circuit 430 into an electrical cord 440. The electrical cord 440 connects to an electrical tool 450, and can be either an extension cord as described in FIGS. 10A-C, or can be non-detachably incorporated onto the electrical tool 450. The electrical tool 450 can be any of a number of construction tools, such as a rotary saw, a sander, nail gun, drill, or other machinery. The electrical tool 450 can also be unrelated to construction, and can be any other type of electrical device which typically draws a high current or where cord wear could be a concern. Such devices could include, for example, a hair dryer, a microwave or other appliance, a vacuum, or other devices.

FIG. 11A corresponds to FIG. 10A incorporated with an electrical tool 450, and shows the electrical cord 440 including a thermal indicator circuit 430*a* near or integrated with a male plug 12 as previously described. FIG. 11B corresponds to FIG. 10B incorporated with an electrical tool 450, and shows the electrical cord 440 including a thermal indicator circuit 430*b* spanning the length L of the electrical cord 440 between the male plug 12 and the electrical tool 450. FIG. 11C corresponds to both FIGS. 10A and 10C, and shows the electrical cord 440 including a thermal indicator circuit 430*a* proximate to the male plug 12 and a second thermal indicator circuit 430*c* proximate to the electrical tool 450.

In each of the embodiments shown, the thermal indicator circuit 430 is connected across the neutral wire 14*d* and conducting wire 14*e*. In alternate configurations of the electrical tool, additional thermal indicator circuits 430 connect between the neutral wire 14*d* and a different conducting wire 14*e-f* in the electrical cord 440. The electrical cord 440 can include more or fewer conducting wires 14, and can include a ground wire (not shown).

Figure 12:
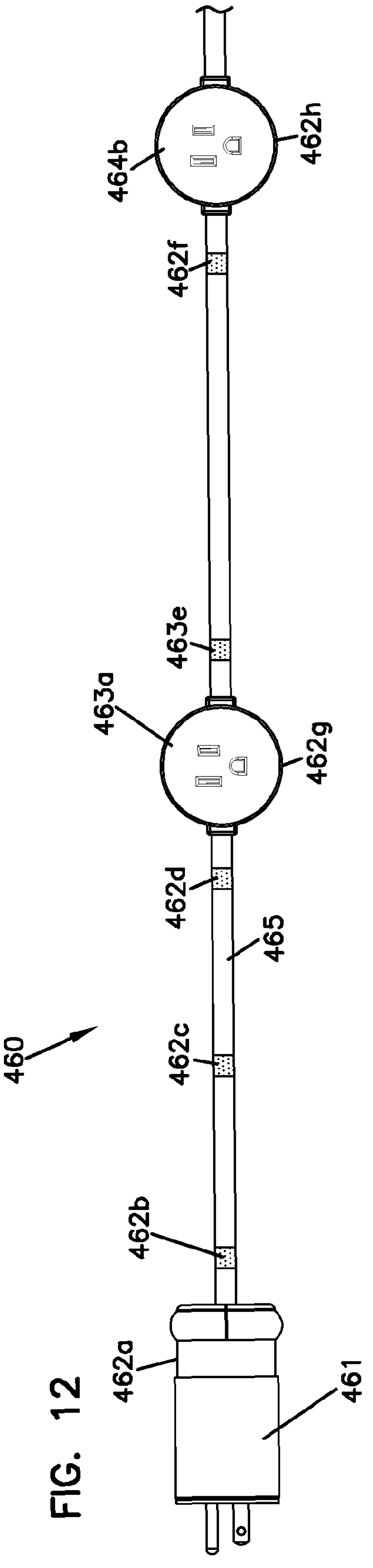
FIG. 12 is a front view of an extension cord having a thermochromatic material to indicate temperature of the cord.
Figure 13A:
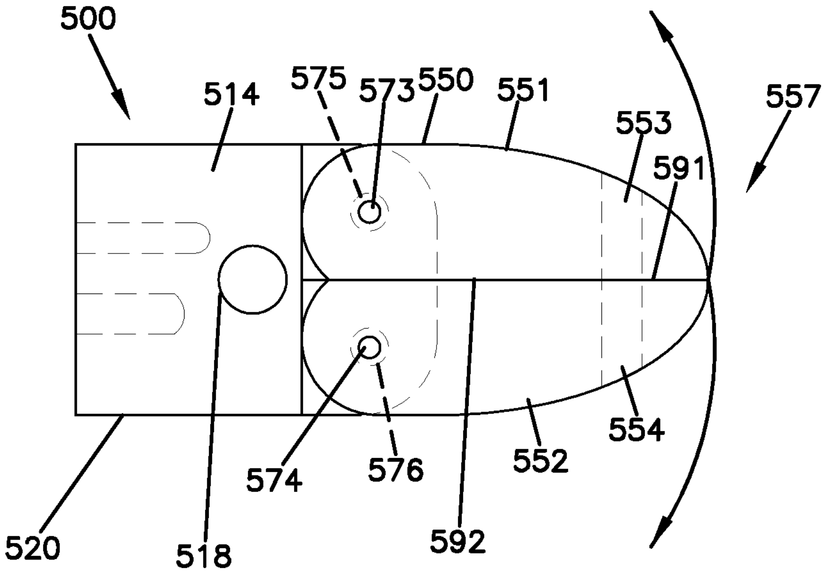
FIG. 13A is a side view of a female socket having an adjustable anchor in a closed position.
Figure 13B:
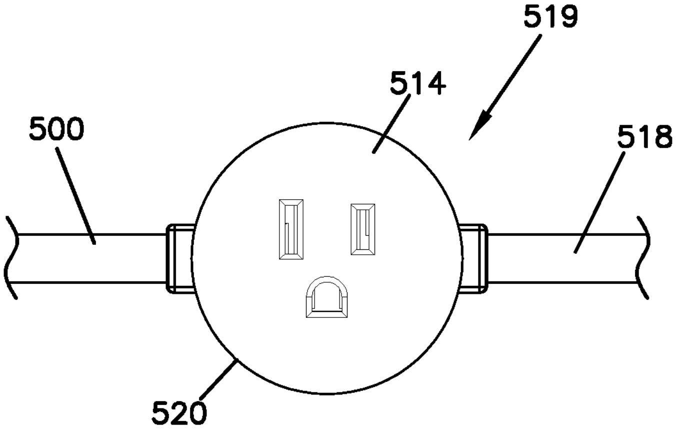
FIG. 13B is a front view of the female socket shown in FIG. 13A with the adjustable anchor in the closed position.
Figure 14B:
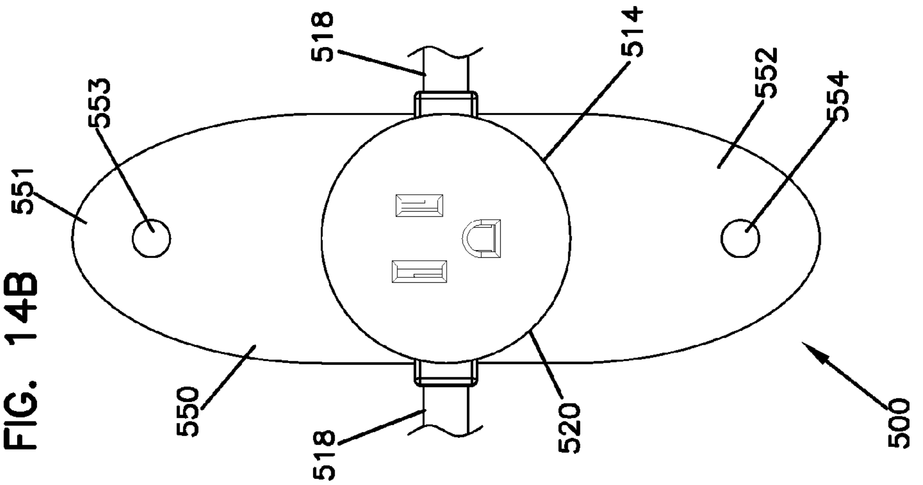
FIG. 14B is a front view of the female socket shown in FIG. 13A when the adjustable anchor is in an open position.
Figure 14A:
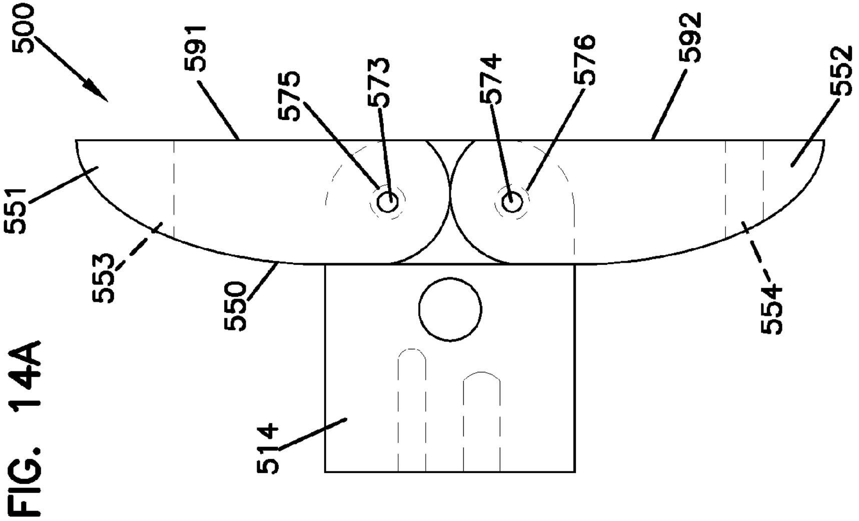
FIG. 14A is a side view of the female socket shown in FIG. 13A when the adjustable anchor is in an open position.

FIG. 12 shows an exemplary extension cord 460 having a male plug 461, one or more female sockets 463*a* and 463*b*, and an electrical conductor 465. A thermochromatic material 462 forms a thermal indicator and is mounted on or integrated into the extension cord 460 at one or more locations 462*a*-462*h*. The thermochromatic material 462 can be formed with any type of temperature sensitive material that changes color in response to temperature as described herein. Examples of possible thermochromatic materials include thermochromatic liquid crystals, polymers, paints, dyes, and inks.

The thermochromatic material 462 can have different forms and can be applied to the extension cord 460 in different ways. For example, the thermochromatic material 462 can be in the form of a tape, label, or other substrate having an adhesive backing that is applied to the surface of the extension cord 460. In another possible embodiment, the thermochromatic material 462 can be a coating or material such as polymer, liquid crystal, paint, dye, or ink applied directly to extension cord 460. In this embodiment, the thermochromatic material 462 can be applied to the surface of the extension cord 460 by any suitable techniques such as brushing, spraying, or otherwise depositing it onto the surface of the extension cord 460. Alternatively, the male plug 461, one or more female sockets 463 or insulator on the conductor 465 is formed, at least in part, with the thermochromatic material 462 molded into the extension cord 460. In these embodiments, the thermochromatic material 462 is applied to the male plug 461 (e.g., thermochromatic material 462*a*), one or more of the female sockets 463 (e.g., thermochromatic material 462*g* and 462*h*), the conductor 465 (thermochromatic material 462*b*-462*f*), or any combination thereof.

The thermochromatic material 462 can have different sizes and shapes. Thermochromatic material 462 can be applied to the extension cord 460 during the manufacturing process or provided to users to apply to the extension cords 460 as an after-market product. Additionally, thermochromatic materials 462 having different sizes and shapes can be positioned at different locations along a single extension cord 460.

In use, the thermochromatic material 462 changes a color upon detecting a temperature at or above a threshold temperature of the extension cord 460 so that it provides a warning that the extension cord 460 might be over-heated. When the portion of the extension cord 460 proximal to the thermochromatic material 462 has a temperature below the threshold temperature, the color of the thermochromatic material 462 has a first color. When the portion of the extension cord 460 proximal to the thermochromatic material 462 reaches a temperature at or above the threshold temperature, the color of the thermochromatic material 462 changes to a second color which is different from the first color.

In an exemplary embodiment, once the temperature of the extension cord 460 proximal to the thermochromatic material 462 decreases and becomes lower than the threshold temperature, the thermochromatic material 462 changes its color from the second color back to the first color. In another exemplary embodiment, the color of the thermochromatic material 462 does not return to its original color even after the temperature falls below the threshold value. An advantage of applying a thermochromatic material 462 to an extension cord is that it can indicate when the extension cord 460 has reached such a temperature as to become a fire hazard.

In an alternative embodiment, the thermochromatic material 462 can be made to change a color when the temperature reaches multiple different temperature thresholds so that multiple warnings can be given to a user. For example, when the temperature of the extension cord 460 reaches or exceeds a first threshold temperature, the thermochromatic material 462 changes its color from a first color (e.g., green) to a second color (e.g., orange). This first color gives a user a first warning. When the temperature of the extension cord 460 continues to rise and reaches a second threshold, the temperature sensitive sheet 462 changes its color from the second color (orange) to a third color (e.g., red) and gives the user a second level warning which is more serious than the first warning regarding over heating of the extension cord 460. The thermochromatic material 462 can further be configured to change from any number of colors to different colors when the temperature reaches a different threshold temperature and then give more levels of warnings as described above. In another possible embodiment, the color of the thermochromatic material 462 may change continuously in responding to the continuous changes of the temperature.

In one possible application, the thermochromatic material 462 is applied to locations of the extension cord 460 that are most likely subject to failure or resistive heating. Examples of such locations are where the electrical current flows from one electrical conductor to another or the cord is most commonly subject to twisting and bending. Examples of such locations include the male plug 461, the female sockets 463, and the portion of the insulator on the conductor 465 that is adjacent to the male plug 461 and the female sockets 463. In other possible embodiments, the thermochromatic material 462 extends along substantially the entire length of the extension cord 460.

Although the thermochromatic material 462 is illustrated as being applied to an extension cord having intermittently spaced female sockets and anchors, it could be applied to many other types of cords. For example, the thermochromatic material 462 can be applied to extension cords having a single female socket or socket block, power cords for electrical devices, and the like.

Referring now to FIGS. 13A, 13B, 14A, and 14B an alternative embodiment of the extension cord 500, includes a female socket 520 mounted on an electrical conductor 518 having an adjustable anchor 550 that can pivot between at least two positions to enable the extension cord 500 to be either suspended or mounted on a vertical surface such as a wall, studs, or posts. The anchor 550 includes first and second anchor members 551 and 552, which are pivotally connected to a housing 514 of the female socket 520 by first and second pivots 573 and 574, respectively. The first anchor member 551 defines a first void 553 and has a first surface 591. The second anchor member 552 defines a second void 554 and has a second surface 592. The first and second voids 553 and 554 are sized to receive a hanger for suspending the extension cord 500 and alternatively a fastener such as a screw, nail, pin, or peg to mount the extension cord 500 on a vertical surface. In the exemplary embodiment, the female socket 520 has a generally tear-drop shape configuration. Although the exemplary embodiment illustrates the adjustable anchor as forming a part of the female socket block, other embodiments will have adjustable anchors positioned along the extension cord at locations other than a female socket.

When the anchor 550 is in a first or closed position (illustrated in FIGS. 13A and 13B), the first and second surfaces 591 and 592 of the first and second anchor members 551 and 552, respectively, are directly adjacent to one another and the first and second voids 553 and 554 are axially aligned to one another. In a second or open position (illustrated in FIGS. 14A and 14B), the first and second surfaces 591 and 592 are coplanar and the voids 553 and 554 are parallel to one another and are orthogonal to the first and second surfaces 591 and 592. The first and second anchor members 551 and 552 can be pivoted between the first and second positions or any other position such as in a 90° arrangement to adapt to a corner. The adjustable anchor 550 provides flexibility to allow the extension cord to be suspended or mounted on a variety of different surfaces having a variety of different orientations and shapes.

In an exemplary embodiment, the anchor 550 is spring-loaded. For example, the anchor 550 includes first and second springs 575 and 576 which extend around the pivots 573 and 574, respectively, and between the first and second members 551 and 552 and the housing 514, respectively. The first and second springs 575 and 576 bias the first and second members 551 and 552 into the first or closed position. Alternative embodiments do not include springs 575 and 576 and the first and second anchor members 551 and 552 are not biased to any particular position. Any suitable structure that biases the first and second anchor members 551 and 552 can be used such as other spring structures. The anchor 550 can also be formed with a resilient material that naturally urges the anchor members 551 and 552 to a predetermined position. In another alternative embodiment, the first and second anchor members 551 and 552 are biased into the second or open position.

In another possible embodiment, the first and second anchor members 551 and 552 engage the housing 514 with a snap fit when in the first or closed position as described herein. The snap fit can be formed with any suitable structure such as nubs (not shown) on the first and second anchor members 551 and 552 and mating depressions (not shown) in the housing 514. The snap fit holds the first and second anchor members 551 and 552 in the closed position so that the first and second voids 553 and 554 remain aligned even when a user is not directly grasping the anchor 550. In another embodiment, the anchor 550 includes a snap fit structure that holds the first and second anchor members 551 and 552 in the second or open position. An advantage of this embodiment is that it can make the female socket 520 and anchor 550 easier to handle when mounting it on a surface as described below in conjunction with FIG. 15, especially if the first and second anchor members 551 and 552 are biased in the closed position.

Figure 15:
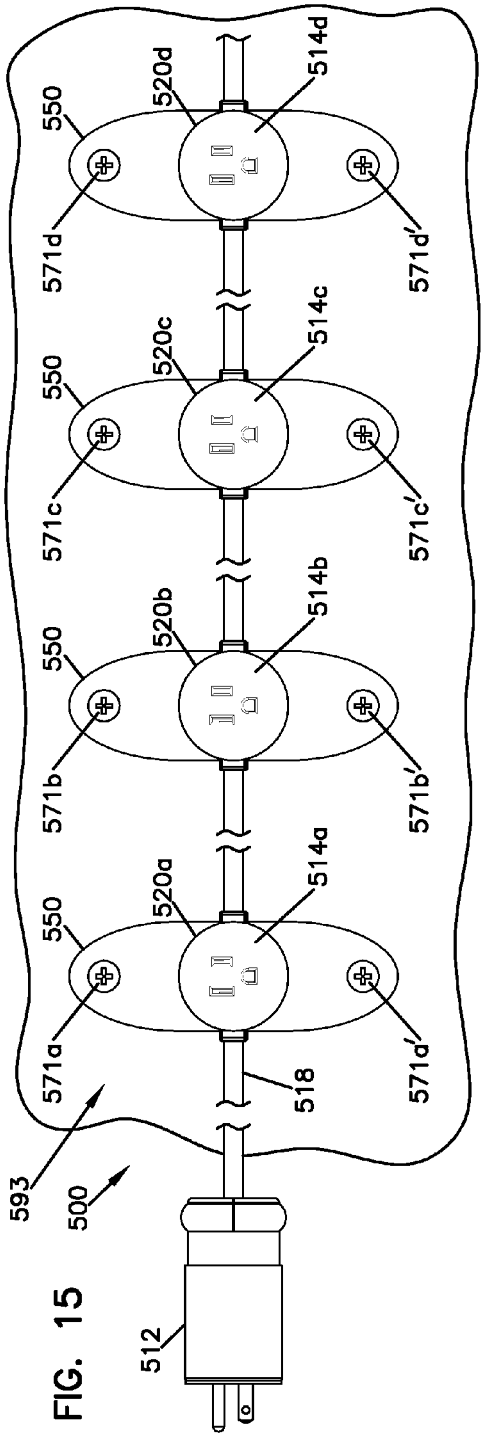
FIG. 15 is a side view of an extension cord having intermittently spaced sockets and adjustable anchors in an open position and mounted on a vertical surface.
Figure 16:
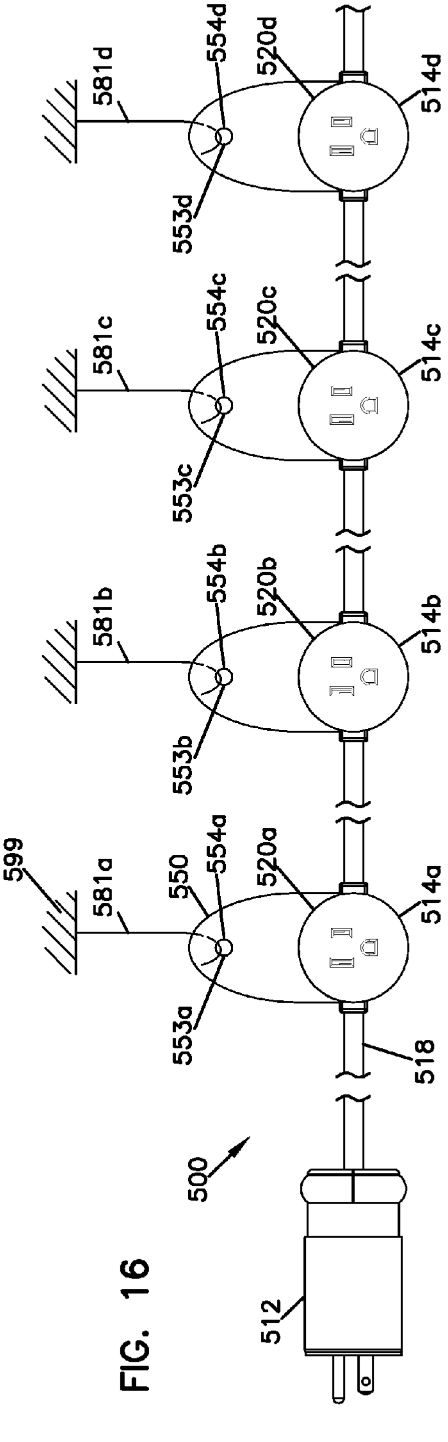
FIG. 16 is a side view of an extension cord having intermittently spaced sockets and adjustable anchors in a closed position suspended.

FIGS. 15 and 16 illustrate alternative ways to use the extension cord 500 and the flexibility provided by the anchor 550. The extension cord 500 includes a male plug 512, a conductor 518, and a plurality of female sockets 520*a*-520*d*.

In FIG. 15, the first and second anchor members 551*a*-551*d* and 552*a*-552*d* are in the second or open position so that the first and second surfaces 591 and 592 for each anchor member 551 and 552 are coplanar and positioned against a vertical surface 593 such as a wall. The first and second anchor members 551*a*-551*d* and 552*a*-552*d* are held in place by fasteners 571*a* and 571*a*'-571*d* and 571*d*', respectively, that extend through the first and second voids 553 and 554 and are attached to the vertical surface 593. The illustrations show the fasteners 571 as screws, but other fasteners or similar structures can be used such as nails, pins, hooks, pegs, and the like. Additionally, the anchors 550*a*-550*d* can be attached to structures other than walls such as studs, posts, and the like. In FIG. 16, the first and second anchor members 551*a*-551*d* and 552*a*-552*d* are in the first or closed positions so the first and second voids 553*a*-553*d* and 554*a*-554*d* are axially aligned. The extension cord 500 is then suspended by hooking the anchors 550*a*-550*d* on a hook 581*a*-581*d*, respectively, that passes through the first and second voids 553*a*-553*d* and 554*a*-554*d*. The hooks 581*a*-581*d* can be attached to an overhead structure 599 such as a ceiling or rafters. Alternatively the hooks 581*a*-581*d* can extend from a wall, from stakes planted in the ground, or from any other structure that can support the extension cord 500. Also, any structure other than a hook that can pass through the voids 553*a*-553*d* and 554*a*-554*d* can be used. An advantage of these cords is that they can be mounted on or suspended from many different types and orientations of surfaces, which allows the cords to be positioned in safe and convenient locations.

Figure 17:
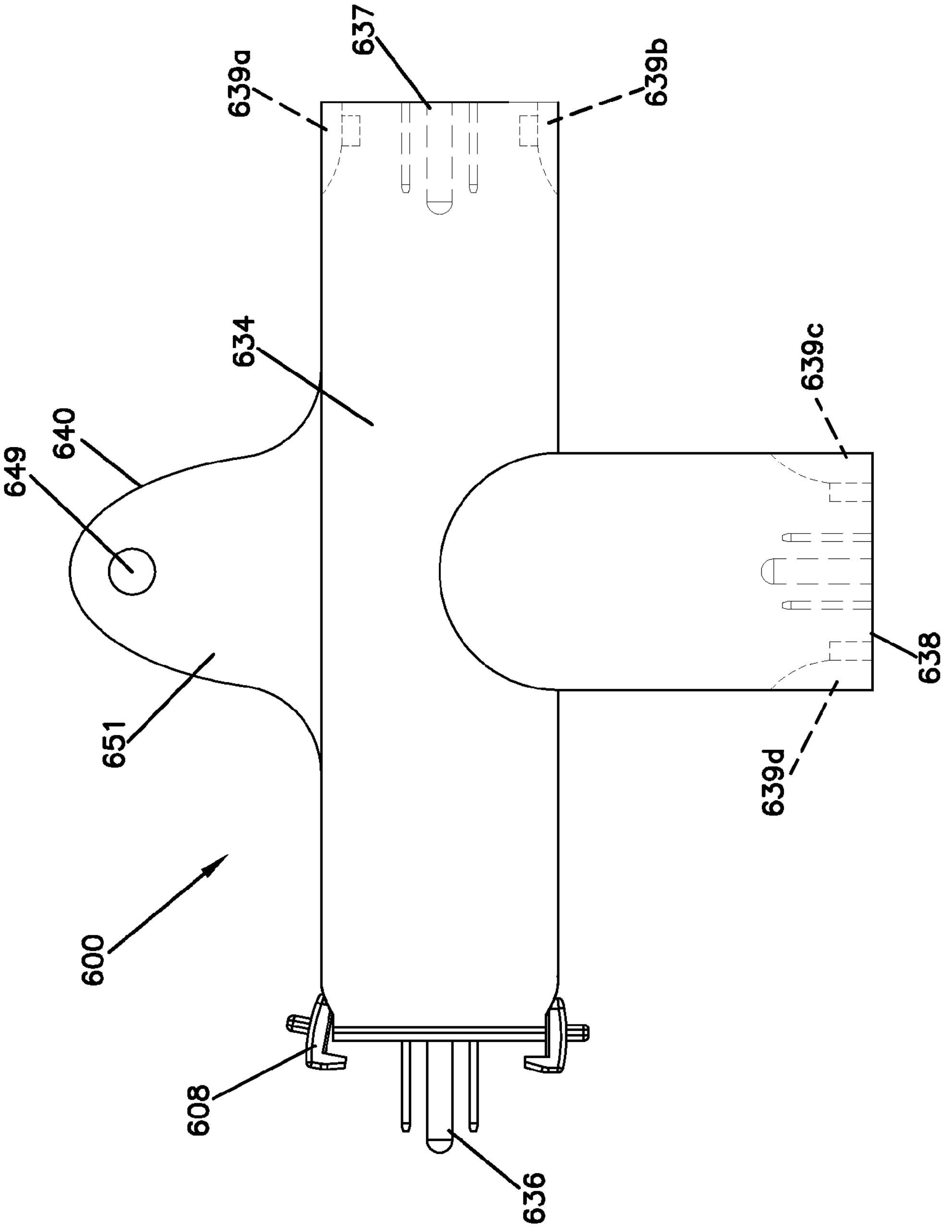
FIG. 17 is a side view of an electrical adaptor having an anchor and a fastener.

FIG. 17 is a view of an electrical adaptor 600 that includes a housing 634 and three electrical connectors 636, 637, and 638 which are positioned in the housing 634. The three electrical connectors 636, 637, and 638 are in electrical communication with each other. The first electrical connector 636 is substantially axially aligned with the second electrical connector 637. In addition, the third electrical connector 638 is positioned generally orthogonal to the first electrical connector 636 and the second electrical connector 637. The first electrical connector 636 is a male electrical plug. The second and third electrical connectors 637 and 638 are female electrical sockets. In alternative embodiments, each of the first, second, third connectors 636, 637, and 638 can be either a male electrical plug or a female electrical socket.

Figure 19:
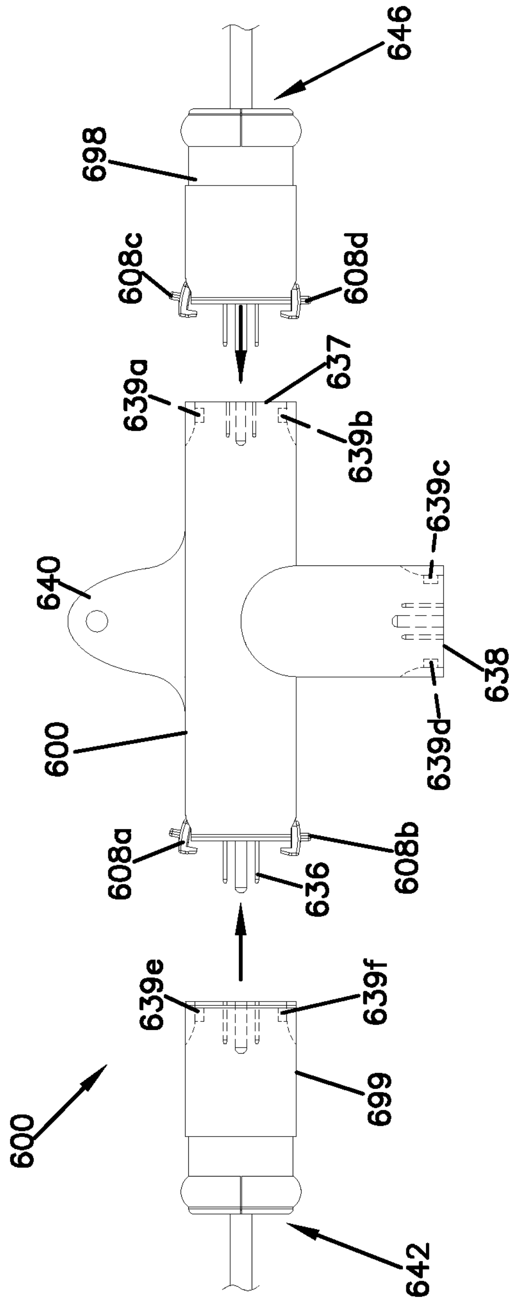
FIG. 19 is a side view of the electrical adaptor shown in FIG. 17 connecting two extension cords.

The electrical adaptor 600 also includes fasteners 608*a* and 608*b* positioned proximate to the first electrical connector 636 (male plug) and pivotally connected to the housing 634 and adapted to secure the housing 634 to an extension cord (shown in FIG. 19). The electrical adaptor 600 also includes engaging structures 639*a*-639*d* proximal to the second and third electrical connectors 637 and 638 (female sockets) configured to engage, receive, catch, or otherwise mate with a fastener (similar to fastener 608) from other extension cords or power cords from electrical devices. In the exemplary embodiment, the engaging structures 639*a*-639*d* are depressions defined in the housing 634 and arranged to receive the fastener. In alternative embodiments, the engaging structures 639*a*-639*d* are protruding flanges (not shown) or other suitable structure configured to be caught or otherwise engaged by a fastener (similar to fastener 608) from other extension cords, power cords, or electrical devices. Although the illustrated embodiment shows the fasteners 608*a* and 608*b* proximal to the male electrical plug and the engaging structures 639*a*-639*d* proximal to the female sockets, other embodiments could reverse this arrangement so the fasteners 608*a* and 608*b* is positioned proximal to the female sockets and the engaging structures 639*a*-639*d* are positioned proximal to the male plugs.

In alternative embodiments, the fasteners 608*a* and 608*b* are biased to a closed position so that the second portions 624 (described below) for each fastener 608*a* and 608*b* are urged toward one another and toward the center of the housing 634 at the site of the electrical connector 636. In various embodiments, the fasteners 608*a* and 608*b* can be spring loaded to create the bias or can be formed with a resilient material that naturally returns to the biased position. Additionally, in other embodiments the fasteners engage the housing 634 with a snap fit such as can be formed with a nub and depression arrangement. The snap fit structure can be positioned to hold the fasteners 608*a* and 608*b* in the open position, the closed position, or both.

In one possible embodiment, the electrical adaptor 600 also includes an anchor 640 operably connected to the housing 634. The anchor 640 is formed by a hole 649 which is defined in the housing 634. The housing 634 includes a projecting member 651 to form the anchor 640 and the projecting member 651 defines the hole 649. In another possible embodiment, the anchor 640 is substantially similar to the anchor discussed above for example in FIGS. 13A, 13B, 14A, and 14B. In an alternative embodiment, the anchor 640 is an adjustable anchor as described in more detail herein.

Generally, the anchor 640 and the third electrical connector 638 are positioned on substantially opposite sides of the housing 634. In one possible embodiment, the anchor 640 is positioned about half way between the first electrical connector 636 and the second electrical connector 637. In alternative embodiments, the anchor 640 can be positioned anywhere along the electrical adaptor 600.

Figure 18A:
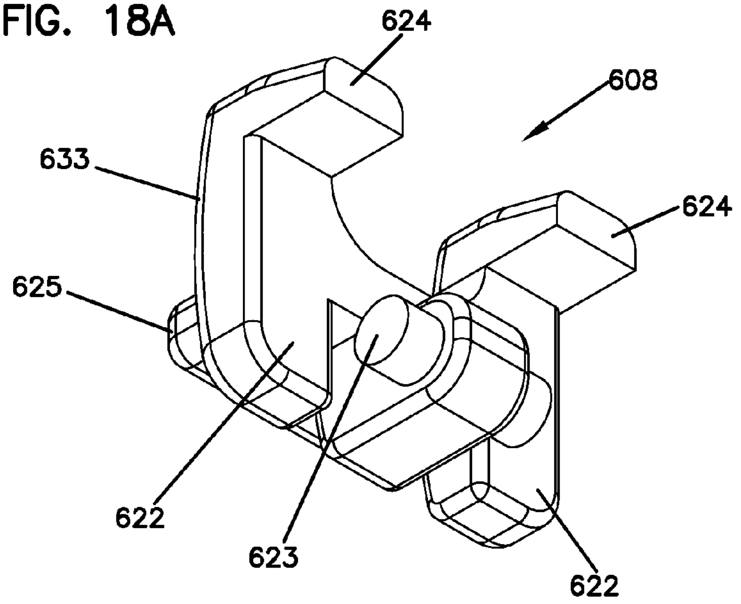
FIGS. 18A and 18B are perspective and side views, respectively, of the fastener shown in FIG. 17.
Figure 18B:
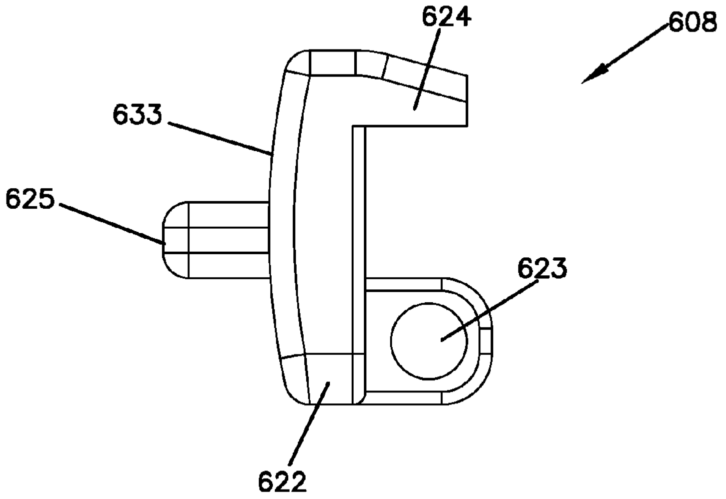

Referring now to FIGS. 18A-18B, the fastener 608 has a pivot 623 that pivotally connects to the housing 634 of the electrical adaptor 630. The fastener 608 has a generally L-shaped member 633 with a first portion 622 and a second portion 624. The fastener 608 pivots around the pivot 623 so the second portion 624 selectively engages an engaging structure (similar to engaging structure 639) on another electrical adaptor, extension cord, power cord, or electrical device. The fastener 608 also has a knob or other projecting member 625 generally parallel to the second portion 624 and projecting from the first portion 622 in a direction opposite to the second portion 624. The projecting member 625 provides a structure for a user to engage with their finger and pivot the fastener 608 around the pivot 623.

The fasteners 608 can have any type of structure that allows a male plug on an electrical adaptor, extension cord, power cord, or electrical device to be secured to a female socket on another electrical adaptor, extension cord, power cord, or electrical device. In lieu of the L-shaped structure illustrated, for example, the fastener 608 can be formed with clips, threaded structures such as nuts or collars, prongs, elastic bands, hook and loop fasteners such as VELCRO brand fasteners, and the like. Additionally, the engaging structure 639 can be any structure that engages the mating fastener to secure together male plugs and female sockets. Examples other than the illustrated depression include flanges, thread structures, elastic bands, hook and loop fasteners, and the like. In yet other embodiments, the fastener 608 may be able to secure a male plug to a female socket without an engaging structure 639.

FIG. 19 is a view of the electrical adaptor 600 including two extension cords 642 and 646. Each of the extension cords 642 and 646 has intermittently spaced female sockets (not shown) and anchors (not shown) as described in more detail herein, although extension cords having a single female socket can be used. The first extension cord 642 has a female socket 699 connected to the first electrical connector 636 while the second extension cord 646 has a male plug 698 connected to the second electrical connector 637. The female socket 699 of the first extension cord 642 has engaging structures 639*e* and 639*f* to mate with the fasteners 608*a* and 608*b*, respectively. The second extension cord 646 has fasteners 608*c* and 608*d* that mate with the engaging structures 639*a* and 639*b*, respectively when the second extension cord 646 connects to the second electrical connector 637. In addition, a third extension cord or electrical device (not shown) can be connected to the third electrical connector 638.

Additionally, alternative embodiments of the electrical adaptor 600 can include any number of electrical connectors and any combination of male plugs and female sockets. Additionally, the electrical connectors (e.g., male plugs and female sockets) can have any orientation with respect to each other including being parallel, orthogonal, or angled. The housing 634 also can have many different configurations other including a t-shape, linear shape, cross, and a 90° bend or corner shape.

Figure 20:
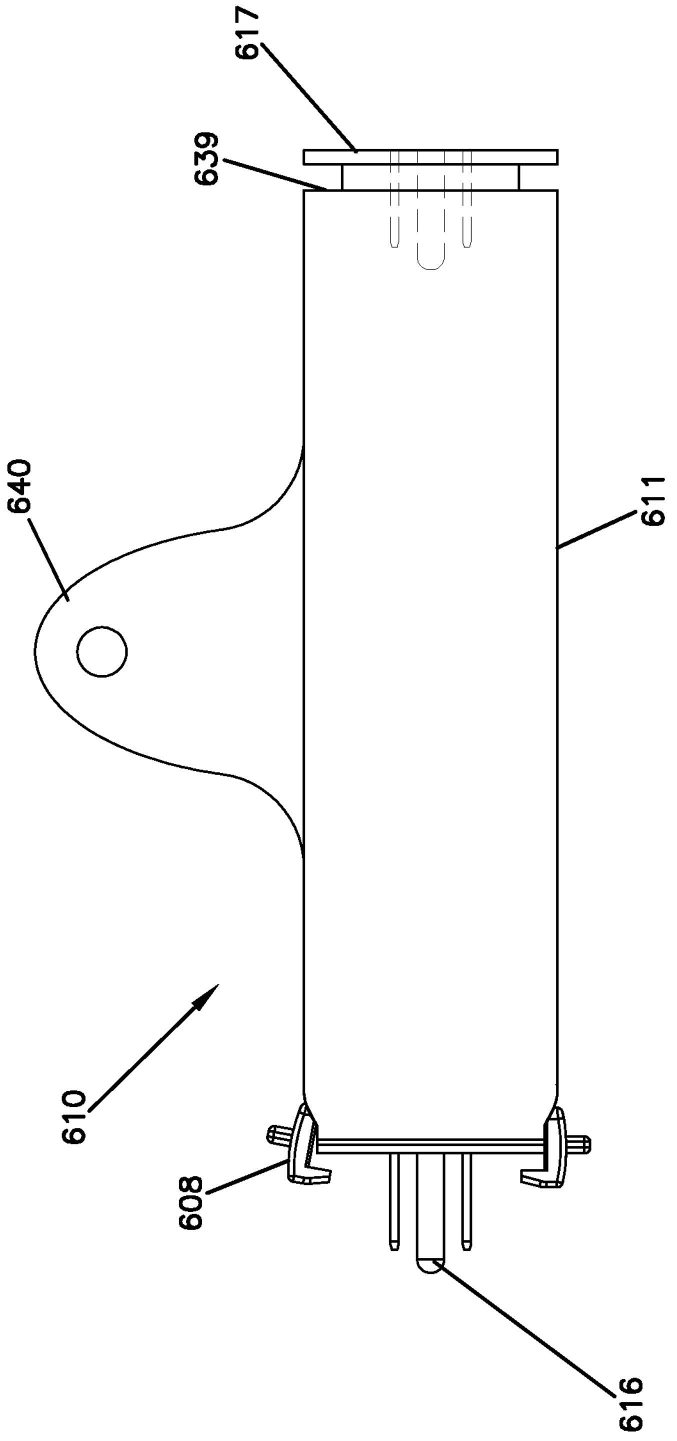
FIG. 20 is a side view of an alternative embodiment of the adaptor of shown in FIG. 17.

Referring to FIG. 20, for example, an electrical adaptor 610 is similar to the electrical adaptor 600 shown in FIG. 17 except that the electrical adaptor 610 has a linear housing 611 and only first and second electrical connectors 616 and 617 positioned at opposite ends of the housing 611. The first and second electrical connectors 616 and 617 are substantially axially aligned with each other. The first electrical connector 616 is a male electrical plug. The second electrical connector 617 is a female electrical socket. Fasteners 608*a* and 608*b* are positioned proximal to the first electrical connector 616 and an engaging structure 639 is positioned proximal to the second electrical connector 617. In the exemplary embodiment, the engaging structure 639 is a groove defined in and extending around the entire circumference of the housing 611. The electrical adaptor 610 has an anchor 640.

Figure 21:
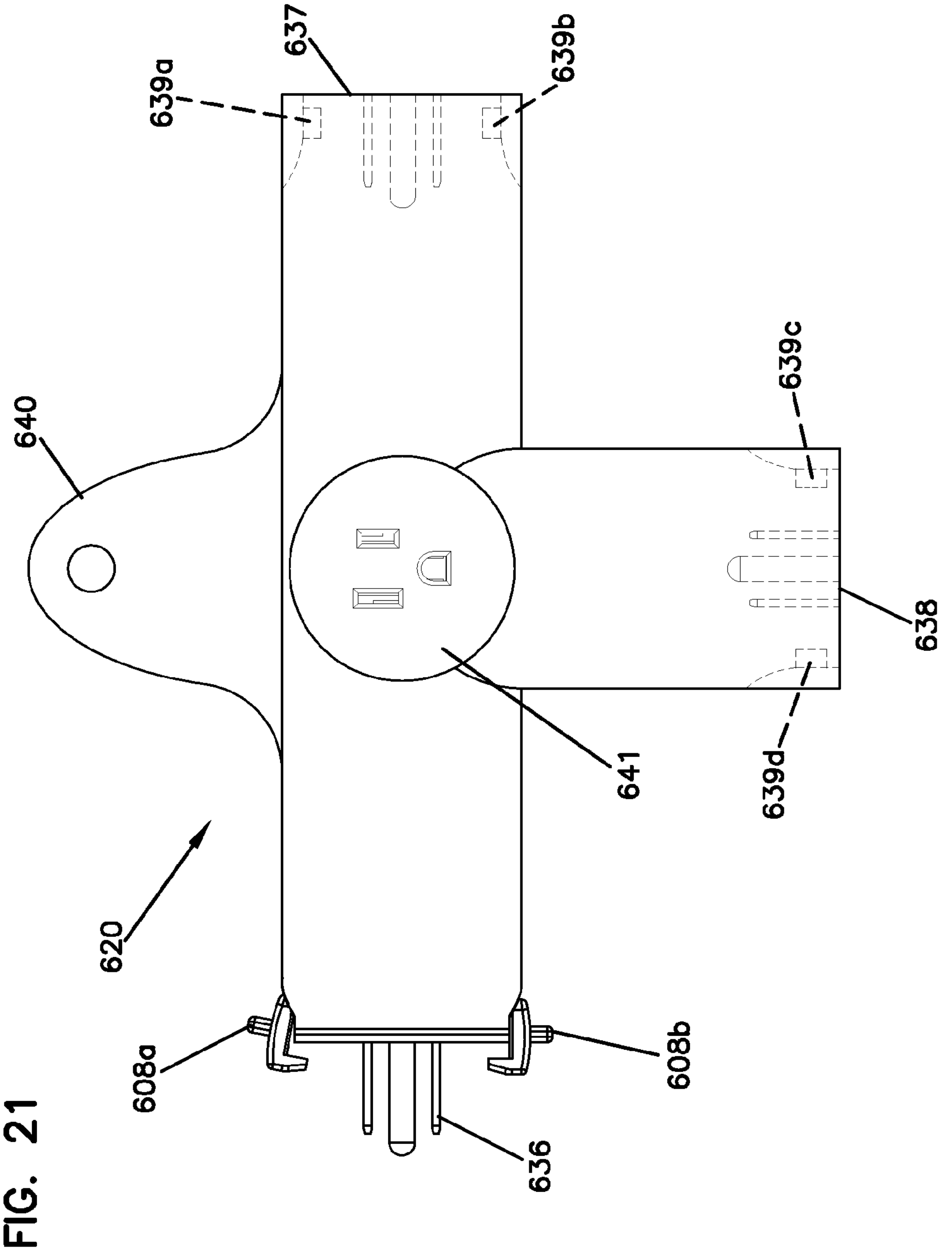
FIG. 21 is a side view of another alternative embodiment of the adaptor shown in FIG. 17.

FIG. 21 shows an electrical adaptor 620 similar to the electrical adaptor 600 shown in FIG. 17 except that the electrical adaptor 620 has a fourth electrical connector 641 that is orthogonal to the first, second, and third electrical connectors 636, 637, and 638. The fourth electrical connector 641 is positioned between the first electrical connector 636 and the second electrical connector 637. In alternative embodiments, the electrical connectors 636, 637, 638, and 641 can be any combination of male plugs and female sockets.

The electrical adaptors described herein can be used with many different types of extension cords including extension cords having intermittently spaced female sockets and/or intermittently spaced anchors. When used with extension cords having intermittently spaced anchors, the anchor 640 on the electrical adaptor 600 provides a location to suspend the string of extension cords proximal to the connection between the male plug of one cord and the mating female socket of the other cord so that the string of extension cords is supported at that location. For extension cords that have intermittently spaced anchors, but do not have any anchor proximal to the male plug or last female socket, electrical adaptors having an anchor 640 provide a way to further support the cords so the male connector receives support and does not hang down significantly lower than other portions of the extension cords. Additionally, the electrical adaptor 600 enables users to assemble a network of extension cords to establish a power distribution network that can be suspended over head, extend along vertical surfaces such as walls or studs, or simply suspended off of the ground on stakes plated in the ground to keep the extension cords out of puddles and other damp surfaces.

The electrical adaptors and extension cords also can be used with the temporary light fixtures described in more detail herein to set up temporary and/or emergency lighting at constructions sights. Alternatively, a networks or string of extension cords can be assembled with lighting fixtures connected to only some of the female sockets to provide both temporary lighting and access to electricity for other electrical devices such as tools. Furthermore, the fasteners described herein provide a mechanism to hold the various components together so they do not become inadvertently disconnected causing a sudden and unexpected loss of power that is potentially both inconvenient and dangerous.

Figure 22:
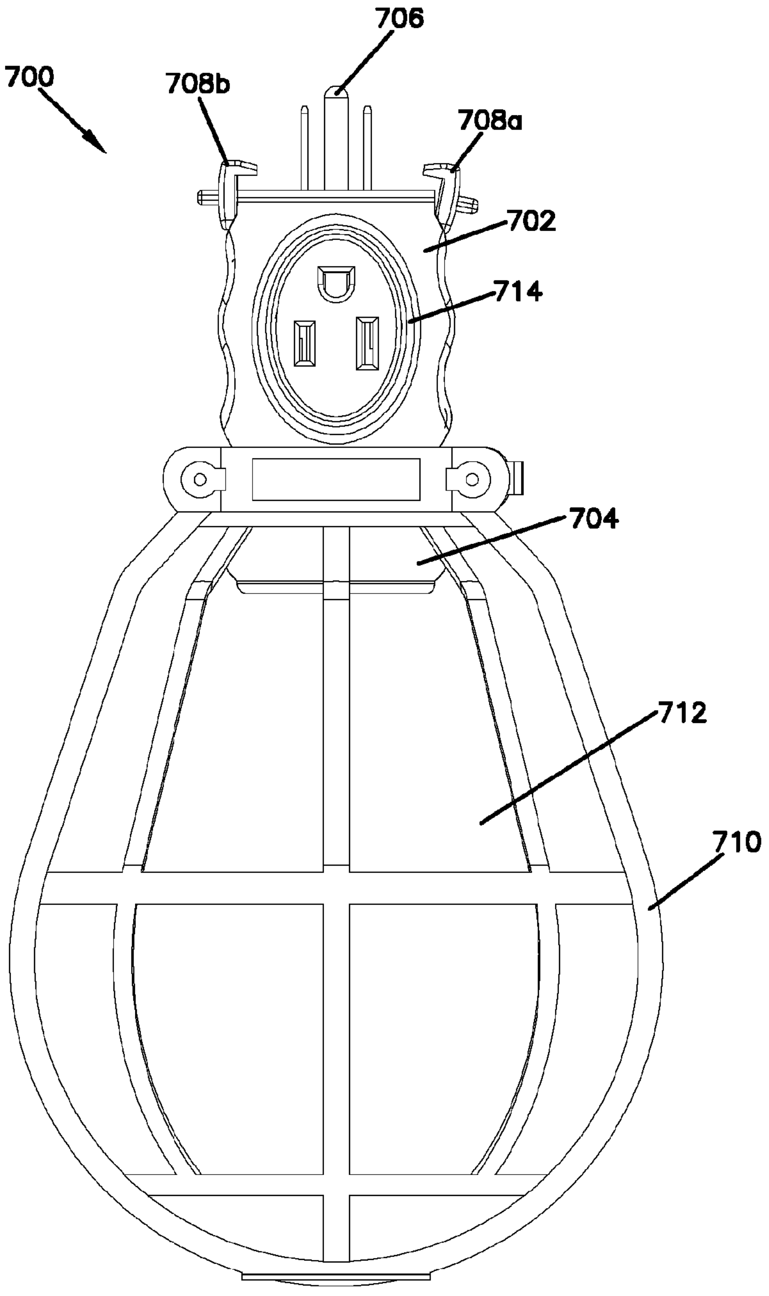
FIG. 22 is a view of a temporary lighting fixture having a fastener to secure the fixture to a female socket.

Referring now to FIG. 22, a temporary lighting fixture 700 includes a housing 702, a light-bulb socket 704, a male electrical plug 706 and fasteners 708*a* and 708*b*. The light-bulb socket 704 is positioned in the housing 702. The male electrical plug 706 is in electrical communication with the light-bulb socket 704. The fasteners 708*a* and 708*b* are operatively connected to the housing 702 and the fastener 708 is adapted to secure the housing 702 to a female socket on an extension cord, electrical adaptor, or other electrical device. The fasteners 708*a* and 708*b* have substantially similar structure as the fastener 608 discussed in more detail herein and is configured to mate with an engaging structure similar to the engaging structure 639 also described in more detail herein.

The temporary lighting fixture 700 also includes a protective cover 710. The protective cover 710 is operatively connected to the housing 702. In addition, the protective cover 710 defines a void 712 for receiving a light-bulb (not shown) to be connected to the light-bulb socket 704. In one possible embodiment, the protective cover 710 has a basket or lattice structure. In other possible embodiments, the protective cover 710 is a translucent plastic or glass enclosure.

In the exemplary embodiment, the temporary lighting fixture 700 also includes a female electrical socket 714 which is positioned in the housing 702 and in electrical communication with the male electrical plug 706. The female electrical socket 714 also includes an engaging structure (not shown) to mate with a fastener on an extension cord, power cord, or electrical device. The engaging structure is similar to engaging structure 639 described herein, and the fastener is similar to the fastener 608 described herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The claimed invention is:

1. An electrical adapter comprising:

a male electrical plug;

a female socket electrically connected to the male electrical plug; and at least one thermal indicator circuit electrically connected to the male electrical plug and the female socket and electrically positioned between an end of the male plug and an end of the female socket, the thermal indicator circuit configured to actuate an alarm upon detecting a temperature at or above a threshold temperature without interrupting electrical flow between the male electrical plug and the female socket.

2. The electrical adaptor of claim 1, further comprising two or more male electrical plugs and two or more corresponding female sockets, each female seeksockets being electrically connected with one of the male electrical plugs providing a one-to-one correspondence between male electrical plugs and female sockets.

3. The electrical adaptor of claim 1, wherein the indicator is a light source.

4. The electrical adaptor of claim 3, wherein the indicator is a light emitting diode.

5. The electrical adaptor of claim 1, wherein the indicator is an audible alarm.

6. The electrical adaptor of claim 1, wherein the thermal indicator circuit includes a thermal switch.

7. The electrical adaptor of claim 6, wherein the thermal switch comprises a thermistor.

8. The electrical adaptor of claim 1 wherein the male electrical plug and female socket form at least part of an electrical path and the thermal indicator is electrically connected to the electrical path proximal to the male electrical plug.

9. The electrical adaptor of claim 1 wherein the male electrical plug and female socket form at least part of an electrical path and the thermal indicator is electrically connected to the electrical path proximal to the female socket.

10. The electrical adaptor of claim 1 wherein the male electrical plug and female socket form at least part of an electrical path and the thermal indicator is electrically connected to the electrical path at a location between the male electrical plug and the female socket.

11. The electrical adapter of claim 1 wherein the male electrical plug is directly connected to the female socket.

12. The electrical adaptor of claim 1 further comprising an electrically conductive wire connected between the male electrical plug and the female socket.

13. The electrical adapter of claim 1 wherein the male electrical plug is configured as a standard 120-volt male plug and the female socket configured to receive a standard 120-volt male electrical plug.

14. The electrical adapter of claim 13 wherein the male plug comprises three prongs and the female socket comprises three contacts.

15. The electrical adapter of claim 13 wherein:

the male plug comprises a prong having a distal tip, the distal tip of the prong forming the end of the male plug; and the female socket comprises an electrical contact having a distal tip, the distal tip of the electrical contact forming the end of the female socket.

16. The electrical adapter of claim 1 further comprising a housing, the male electrical plug having at least two prongs projecting from the housing and the female socket having at least two electrical contacts positioned within the housing.

17. An electrical adaptor comprising:

a housing;

a male electrical plug, the male electrical plug comprising a prong extending from the housing and being configured as a standard 120-volt male plug, the prong comprising a distal tip, the distal tip forming an end to the male electrical plug;

a female socket electrically connected to the male electrical plug, the female socket comprising an electrical contact positioned in the housing, the female socket configured to receive a standard 120-volt male plug, the electrical contact comprising a distal tip, the distal tip forming an end to the female socket; and at least one thermal indicator circuit electrically connected to the male electrical plug and the female socket and electrically positioned between an end of the male plug and an end of the female socket, the thermal indicator circuit configured to actuate an alarm upon detecting a temperature at or above a threshold temperature without interrupting electrical flow between the male electrical plug and the female socket.

* * * * *